United States Patent
Eitan et al.

(10) Patent No.: US 10,244,531 B2
(45) Date of Patent: Mar. 26, 2019

(54) RE-CHANNELIZATION OF SUB-CARRIERS

(71) Applicant: QUALCOMM Incorporated, San Diego, CA (US)

(72) Inventors: Alecsander Eitan, Haifa (IL); Amichai Sanderovich, Atlit (IL); Gal Basson, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 15/247,469

(22) Filed: Aug. 25, 2016

(65) Prior Publication Data

US 2017/0070995 A1 Mar. 9, 2017

Related U.S. Application Data

(60) Provisional application No. 62/303,336, filed on Mar. 3, 2016, provisional application No. 62/214,117, filed on Sep. 3, 2015.

(51) Int. Cl.
*H04W 72/04* (2009.01)
*H04L 5/00* (2006.01)
*H04L 27/26* (2006.01)

(52) U.S. Cl.
CPC ......... *H04W 72/0453* (2013.01); *H04L 5/001* (2013.01); *H04L 5/0007* (2013.01); *H04L 27/2602* (2013.01); *H04L 5/0041* (2013.01)

(58) Field of Classification Search
CPC .. H04W 72/0453; H04L 5/001; H04L 5/0007; H04L 5/0041
See application file for complete search history.

(56) References Cited

U.S. PATENT DOCUMENTS

| 8,953,615 B2 * | 2/2015 | Cai | H04L 5/0044 |
| | | | 370/395.4 |
| 2016/0028578 A1 * | 1/2016 | Ramakrishna | H04L 1/0005 |
| | | | 370/329 |

FOREIGN PATENT DOCUMENTS

WO WO-2012051319 A1 4/2012

OTHER PUBLICATIONS

International Search Report and Written Opinion—PCT/US2016/049113—ISA/EPO—dated Nov. 7, 2016.
QUALCOMM: "PHY Rate for NG60; 11-14-1378-00-ng60-phy-rate-for-ng60", IEEE Draft; 11-14-1378-00-NG60-PHY-Rate-For-NG60, IEEE-SA Mentor, Piscataway, NJ USA, vol. 802.11 NG60, Nov. 3, 2014 (Nov. 3, 2014), pp. 1-16, XP068071207, [retrieved on Nov. 3, 2014].
Torab P., "Channel Bonding Framework; 11-15-0335-02-ng60-channel-bonding-framework", IEEE Draft; 11-15-0335-02-NG60-Channel-Bonding-Framework, IEEE-SA Mentor, Piscataway, NJ USA, vol. 802.11 NG60, No. 2, Mar. 9, 2015 (Mar. 9, 2015), pp. 1-9, XP068082969, [retrieved on Mar. 9, 2015].

\* cited by examiner

*Primary Examiner* — Jianye Wu
(74) *Attorney, Agent, or Firm* — Loza & Loza, LLP/Qualcomm

(57) ABSTRACT

Certain aspects of the present disclosure provide a method for wireless communications. The method comprises generating a frame comprising a first portion and a second portion. The method also comprises outputting the first portion of the frame for transmission on at least one channel, shifting a center frequency of the at least one channel, and outputting the second portion of the frame for transmission on the at least one channel after the center frequency shift.

30 Claims, 14 Drawing Sheets

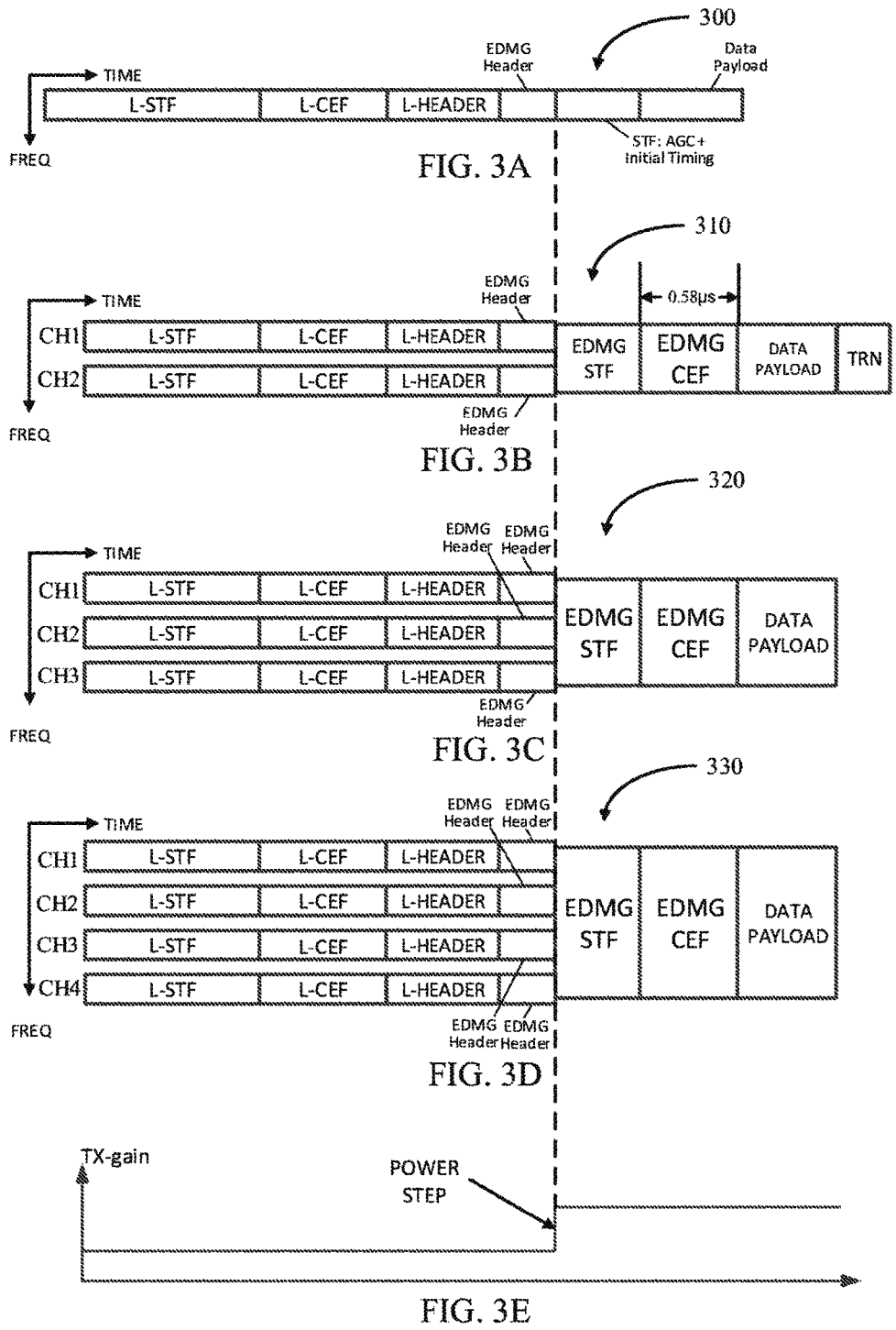

RE-CHANNELIZATION OF SUB-CARRIERS

RELATED APPLICATIONS

This application claims priority under 35 U.S.C. § 119(e) to U.S. Provisional Application No. 62/214,117 filed on Sep. 3, 2015, and U.S. Provisional Application No. 62/303,336 filed on Mar. 3, 2016, the entire specifications of which are incorporated herein by reference.

FIELD

Certain aspects of the present disclosure generally relate to wireless communications and, more particularly, to re-channelization of sub-carriers.

BACKGROUND

In order to address the issue of increasing bandwidth requirements demanded for wireless communications systems, different schemes are being developed. In some schemes, data is wirelessly transmitted at high data rates (e.g., several Gigabits/s) over one or more channels in the 60 GHz range.

SUMMARY

A first aspect relates to a method for wireless communications. The method comprises generating a frame comprising a first portion and a second portion, outputting the first portion of the frame for transmission on at least one channel, shifting a center frequency of the at least one channel, and outputting the second portion of the frame for transmission on the at least one channel after the center frequency shift.

A second aspect relates to an apparatus for wireless communications. The system comprises a processing system configured to generate a frame comprising a first portion and a second portion, and to shift a center frequency of at least one channel The system also comprises an interface configured to output the first portion of the frame for transmission on the at least one channel before the center frequency shift, and to output the second portion of the frame for transmission on the at least one channel after the center frequency shift.

A third aspect relates to an apparatus for wireless communications. The apparatus comprises means for generating a frame comprising a first portion and a second portion, means for outputting the first portion of the frame for transmission on at least one channel, means for shifting a center frequency of the at least one channel, and means for outputting the second portion of the frame for transmission on the at least one channel after the center frequency shift.

A fourth aspect relates to a computer readable medium comprising instructions stored thereon for generating a frame comprising a first portion and a second portion, outputting the first portion of the frame for transmission on at least one channel, shifting a center frequency of the at least one channel, and outputting the second portion of the frame for transmission on the at least one channel after the center frequency shift.

A fifth aspect relates to a wireless node. The wireless node comprises at least one antenna, and a processing system configured to generate a frame comprising a first portion and a second portion, and to shift a center frequency of at least one channel. The wireless node also comprises an interface configured to output the first portion of the frame for transmission, via the at least one antenna, on the at least one channel before the center frequency shift, and to output the second portion of the frame for transmission, via the at least one antenna, on the at least one channel after the center frequency shift.

A sixth aspect relates to a method for wireless communications. The method comprises receiving, via a receiver, a first portion of a frame on at least one channel, shifting a frequency of the receiver if a center frequency of the at least one channel is shifted, and, after the receiver frequency shift, receiving, via the receiver, a second portion of the frame on the at least one channel The method also comprises processing the received first portion of the frame to obtain first information, and processing the received second portion of the frame to obtain second information.

A seventh aspect relates to an apparatus for wireless communications. The apparatus comprises an interface configured to receive, via a receiver, a first portion and a second portion of a frame on the at least one channel. The apparatus also comprises a processing system configured to shift a frequency of the receiver if a center frequency of the at least one channel is shifted between reception of the first portion of the frame and reception of the second portion of the frame, to process the received first portion of the frame to obtain first information, and to process the received second portion of the frame to obtain second information.

An eighth aspect relates to an apparatus for wireless communications. The apparatus comprises means for receiving a first portion of a frame on at least one channel, means for shifting a receiver frequency of the apparatus if a center frequency of the at least one channel is shifted, and means for receiving, after the receiver frequency shift, a second portion of the frame on the at least one channel. The apparatus also comprises means for processing the received first portion of the frame to obtain first information, and means for processing the received second portion of the frame to obtain second information.

A ninth aspect relates to a computer readable medium comprising instructions stored thereon for receiving, via a receiver, a first portion of a frame on at least one channel, shifting a frequency of the receiver if a center frequency of the at least one channel is shifted, after the receiver frequency shift, receiving, via the receiver, a second portion of the frame on the at least one channel, processing the received first portion of the frame to obtain first information, and processing the received second portion of the frame to obtain second information.

A tenth aspect relates to a wireless node. The wireless node comprises at least one antenna, and a receiver configured to receive, via the at least one antenna, a first portion and a second portion of a frame on the at least one channel The wireless node also comprises a processing system configured to shift a frequency of the receiver if a center frequency of the at least one channel is shifted between reception of the first portion of the frame and reception of the second portion of the frame, to process the received first portion of the frame to obtain first information, and to process the received second portion of the frame to obtain second information.

BRIEF DESCRIPTION OF THE DRAWINGS

FIGS. 3A-3D illustrate exemplary frames in accordance with certain aspects of the present disclosure.

FIG. 3E illustrates an exemplary transmit power profile for the exemplary frames shown in FIGS. 3A-3D in accordance with certain aspects of the present disclosure.

DETAILED DESCRIPTION

Figure 1:
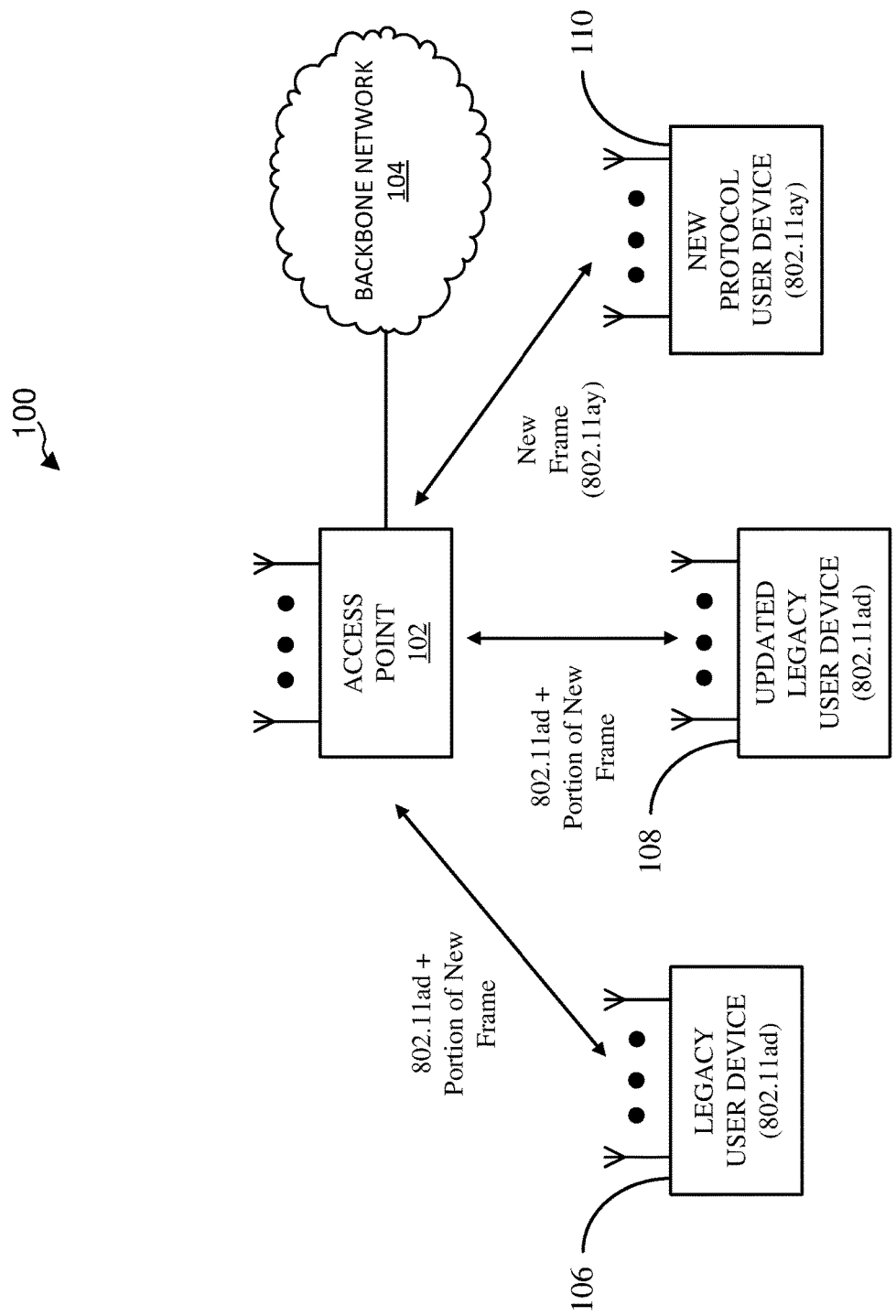
FIG. 1 illustrates an exemplary wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple access terminals. A TDMA system may allow multiple access terminals to share the same frequency channel by dividing the transmission signal into different time slots, each time slot being assigned to different access terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

With reference to the following description, it shall be understood that not only communications between access points and user devices are allowed, but also direct (e.g., peer-to-peer) communications between respective user devices are allowed. Furthermore, a device (e.g., an access point or user device) may change its behavior between a user device and an access point according to various conditions. Also, one physical device may play multiple roles: user device and access point, multiple user devices, multiple access points, for example, on different channels, different time slots, or both.

FIG. 1 is a diagram of an exemplary wireless communications network 100 in accordance with certain aspects of the present disclosure. The communication network 100 comprises an access point 102, a backbone network 104, a legacy user device 106, an updated legacy user device 108, and a new protocol user device 110.

The access point 102, which may be configured for a wireless local area network (LAN) application, may facilitate data communications between the user devices 106, 108, and 110. The access point 102 may further facilitate data communications between devices coupled to the backbone network 104 and any one or more of the user devices 106, 108, and 110.

In this example, the access point 102 and the legacy user device 106 communicate data between each other using a legacy protocol. One example of a legacy protocol includes IEEE 802.11ad. According to this protocol, data communications between the access point 102 and the legacy user device 106 are effectuated via transmission of data frames that comply with the 802.11ad protocol. As discussed further herein, an 802.11ad data frame includes a preamble consisting of a legacy short training field (L-STF) and a legacy channel estimation sequence (L-CES) (now commonly referred to as a legacy channel estimation field (L-CEF)), a legacy header (L-Header), a data payload, and an optional beamforming training field.

The L-STF sequence includes a plurality of Golay sequences ($Ga_{128}$) and a negative Golay sequence ($-Ga_{128}$) to signify the end of the L-STF sequence. The L-STF sequence may assist a receiver in setting up its automatic gain control (AGC), timing, and frequency setup for accurately receiving the rest of the frame and subsequent frames. In the case of a single carrier (SC) transmission mode, the L-CEF sequence includes a $Gu_{512}$ sequence (consisting of the following concatenated Golay sequences ($-Gb_{128}$, $-Ga_{128}$, $Gb_{128}$, $-Ga_{128}$) followed by a $Gv_{512}$ sequence (consisting of the following concatenated Golay sequences ($-Gb_{128}$, $Ga_{128}$, $-Gb_{128}$, $-Ga_{128}$), and ending with a $Gv_{128}$ (same as $-Gb_{128}$) sequence. In the case of an orthogonal frequency division multiplexing (OFDM) transmission mode, the L-CEF sequence includes a $Gv_{512}$ sequence followed by a $Gu_{512}$ sequence, and ending with a $Gv_{128}$ sequence. The L-CEF sequence assists the receiver in estimating the channel frequency response through which the frame is sent.

The L-Header includes various information about the frame. Such information includes a scrambler initiation field, which specifies a seed for the scrambling applied to the remainder of the L-Header and the data payload for data whitening purposes. The L-Header also includes the modulation and coding scheme (MCS) field to indicate one out of 12 defined MCS used for transmitting the data payload of the frame. The L-Header includes a length field to indicate the length of the data payload in octets. The L-Header further includes a training length field to indicate a length of the optional beam forming training sequence at the end of the frame. Additionally, the L-Header includes a packet type field to indicate whether the optional beam forming field pertains to transmission or reception. Further, the L-Header includes a header checksum (HCS) field to indicate a CRC-32 checksum over the header bits.

Referring again to FIG. 1, the legacy user device 106 is capable of decoding the entire 802.11ad data frame. The new frame disclosed herein, which may be subsequently adopted for the new standard or protocol 802.11ay, provides some backward compatibility feature. As discussed in more detail herein, the new frame includes the preamble (L-STF and L-CEF) and the L-Header of the 802.11ad protocol, and one or more additional portions pertaining to the new protocol. Accordingly, the legacy user device 106 is configured to decode the 802.11ad preamble (L-STF and L-CEF) and L-Header portion of the new frame, but is not configured to decode the remaining portion of the new frame. The legacy user device 106 may decode the 802.11ad preamble and header portion of the new frame in order to calculate a network allocation vector (NAV) to determine the length of the new frame for transmission collision avoidance purposes.

The updated legacy user device 108 also operates under the legacy 802.11ad protocol, and is able to communicate with the access point 102 using 802.11ad data frames. However, the frame processing capability of the updated legacy user device 108 has been updated to interpret certain bits in the L-Header of the new frame that indicate an attribute of the new frame, as discussed further herein. In accordance with the legacy 802.11ad protocol, these bits are allocated to least significant bits (LSBs) of the data length in the L-Header. But, in accordance with the new frame, the otherwise allocated bits of the L-Header are used to indicate a transmission power difference between a first portion of the new frame and a second portion of the new frame in accordance with a certain transmission mode associated with the new frame. These bits allow the updated legacy user device 108 to anticipate the power difference (an increase) for signal interference management purposes. Although, in this example, the allocation of the LSB length bits signifies the aforementioned power difference, it shall be understood that these bits may be allocated for other purposes.

The new protocol user device 110 is capable of communicating with the access point 102 using the new data frame, which some or all features of the new frame may be adopted for the 802.11ay protocol. As discussed further herein, the new data frame includes the legacy 802.11ad preamble (L-STF and L-CEF) and L-Header, with the L-Header slightly modified to indicate the transmission mode associated with the new frame and, as previously discussed, a transmission power difference between a first portion of the new frame and a second portion of the new frame. The slight modification to the L-Header of the new frame does not impact the decoding of the L-Header by the legacy user device 106 and the updated legacy user device 108. The bits in the L-Header of the new frame that indicate the transmission mode are reserved bits in the standard 802.11ad legacy header.

In addition to the legacy preamble (L-STF and L-CEF) and L-Header, the new frame further comprises an Extended Directional Multigigabit (EDMG) Header. As discussed in more detail herein, the EDMG Header comprises a plurality of fields for indicating various attributes of the new frame. Such attributes includes payload data length, number of low density parity check (LDPC) data blocks in the EDMG Header, the number of spatial streams supported, the number of bonded channels, the leftmost (lowest frequency) channel of the bonded channels, the MCS used for the data payload of the new frame, the transmit power difference between different portions of the frame, and other information. The EDMG Header may further be appended with payload data that is not in the data payload portion (now commonly referred to as the EDMG Data Payload) of the new frame. For short messages, all of the payload data may appended to the EDMG Header, thereby avoiding the need for transmitting the "separate" EDMG Data Payload of the new frame, which adds significant overhead to the frame.

The new data frame is configured to provide additional features to improve data throughput by employing higher data modulation schemes, channel bonding, channel aggregation, and improved spatial transmission via multiple input multiple output (MIMO) antenna configurations. For instance, the legacy 802.11ad protocol includes BPSK, QPSK, and 16QAM available modulation schemes. According to the new protocol, higher modulation schemes, such as 64QAM, 64APSK, 128APSK, 256QAM, and 256APSK are available. Additionally, a plurality of channels may be bonded or aggregated to increase data throughput. Further, such bonded or aggregated channels may be transmitted by way of a plurality of spatial transmissions using a MIMO antenna configuration.

Figure 2:
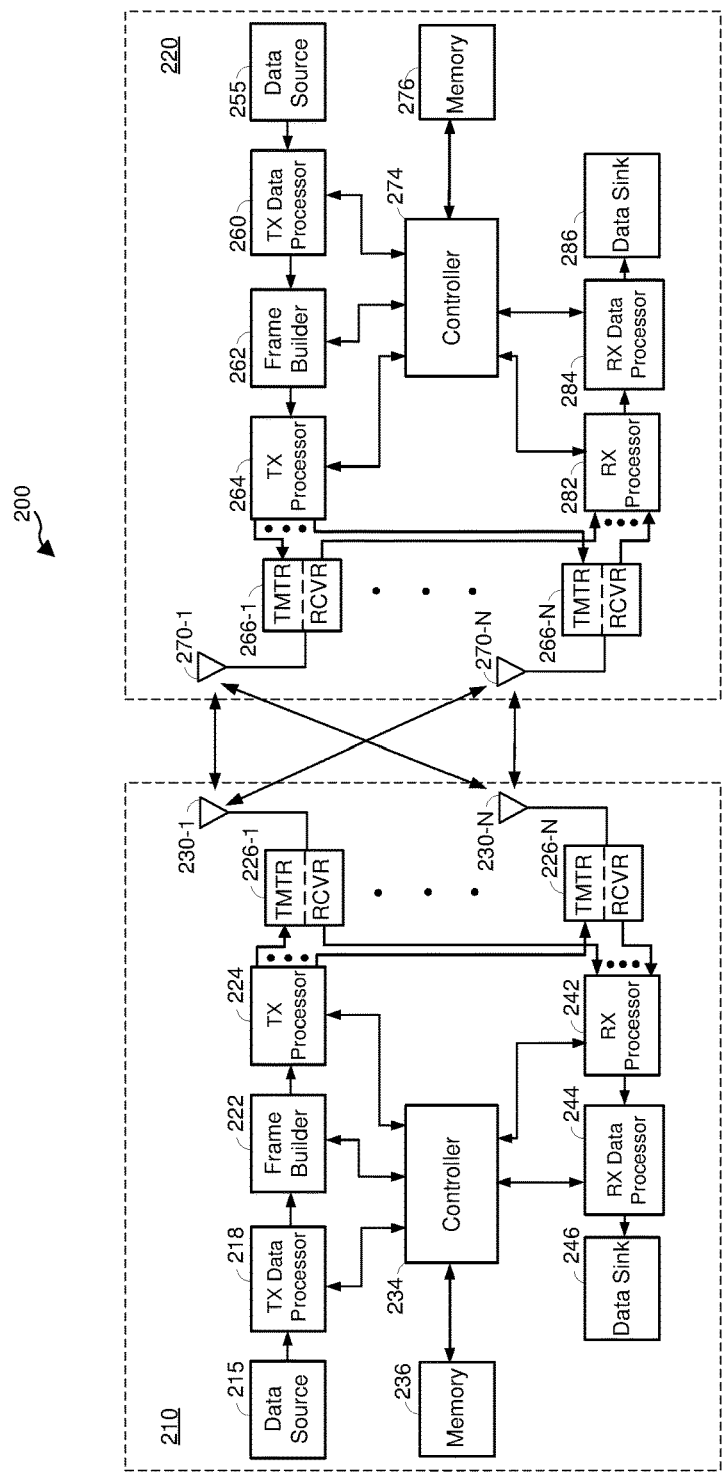
FIG. 2 is a block diagram of an exemplary access point and access terminal in accordance with certain aspects of the present disclosure.

FIG. 2 illustrates a block diagram of an access point 210 (generally, a first wireless node) and an access terminal 220 (generally, a second wireless node) of the wireless communication system 200. The access point 210 is a transmitting entity for the downlink and a receiving entity for the uplink. The access terminal 220 is a transmitting entity for the uplink and a receiving entity for the downlink. As used herein, a "transmitting entity" is an independently operated apparatus or wireless node capable of transmitting data via a wireless channel, and a "receiving entity" is an independently operated apparatus or wireless node capable of receiving data via a wireless channel Although, in this example, wireless node 210 is an access point and wireless node 220 is an access terminal, it shall be understood that the wireless node 210 may alternatively be an access terminal, and wireless node 220 may alternatively be an access point. The wireless node 210 may be used to implement the access point 102 in FIG. 1, and the wireless node 220 may be used to implement any one of the user devices 106, 108 and 110 in FIG. 1.

For transmitting data, the access point 210 comprises a transmit data processor 218, a frame builder 222, a transmit processor 224, a plurality of transceivers 226-1 to 226-N, and a plurality of antennas 230-1 to 230-N. The access point 210 also comprises a controller 234 configured to control operations of the access point 210, as discussed further below.

In operation, the transmit data processor 218 receives data (e.g., data bits) from a data source 215, and processes the data for transmission. For example, the transmit data processor 218 may encode the data (e.g., data bits) into encoded data, and modulate the encoded data into data symbols. The transmit data processor 218 may support different modulation and coding schemes (MCSs). For example, the transmit data processor 218 may encode the data (e.g., using low-density parity check (LDPC) encoding) at any one of a plurality of different coding rates. Also, the transmit data processor 218 may modulate the encoded data using any one of a plurality of different modulation schemes, including, but not limited to, BPSK, QPSK, 16QAM, 64QAM, 64APSK, 128APSK, 256QAM, and 256APSK.

In certain aspects, the controller 234 may send a command to the transmit data processor 218 specifying which modulation and coding scheme (MCS) to use (e.g., based on channel conditions of the downlink), and the transmit data processor 218 may encode and modulate data from the data source 215 according to the specified MCS. It is to be appreciated that the transmit data processor 218 may perform additional processing on the data such as data scrambling, and/or other processing. The transmit data processor 218 outputs the data symbols to the frame builder 222.

The frame builder 222 constructs a frame (also referred to as a packet), and inserts the data symbols into a data payload of the frame. Exemplary frame structures or formats are discussed further below. The frame builder 222 outputs the frame to the transmit processor 224. The transmit processor 224 processes the frame for transmission on the downlink. For example, the transmit processor 224 may support different transmission modes such as an orthogonal frequency-division multiplexing (OFDM) transmission mode and a single-carrier (SC) transmission mode. In this example, the controller 234 may send a command to the transmit processor 224 specifying which transmission mode to use, and the transmit processor 224 may process the frame for transmission according to the specified transmission mode.

In certain aspects, the transmit processor 224 may support multiple-output-multiple-input (MIMO) transmission. In these aspects, the access point 210 includes multiple antennas 230-1 to 230-N and multiple transceivers 226-1 to 226-N (e.g., one for each of the antennas 230-1 to 230-N). The transmit processor 224 may perform spatial processing on the incoming frames and provide a plurality of transmit frame streams for the plurality of antennas 230-1 to 230-N. The transceivers 226-1 to 226-N receive and process (e.g., convert to analog, amplify, filter, and frequency upconvert) the respective transmit frame streams to generate transmit signals for transmission via the antennas 230-1 to 230-N.

For transmitting data, the access terminal 220 comprises a transmit data processor 260, a frame builder 262, a transmit processor 264, a plurality of transceivers 266-1 to 266-N, and a plurality of antennas 270-1 to 270-N. The access terminal 220 may transmit data to the access point 210 on the uplink, and/or transmit data to another access terminal (e.g., for peer-to-peer communication). The access terminal 220 also comprises a controller 274 configured to control operations of the access terminal 220, as discussed further below.

In operation, the transmit data processor 260 receives data (e.g., data bits) from a data source 255, and processes (e.g., encodes and modulates) the data for transmission. The transmit data processor 260 may support different MCSs. For example, the transmit data processor 260 may encode the data (e.g., using LDPC encoding) at any one of a plurality of different coding rates, and modulate the encoded data using any one of a plurality of different modulation schemes, including, but not limited to, BPSK, QPSK, 16QAM, 64QAM, 64APSK, 128APSK, 256QAM, and 256APSK. In certain aspects, the controller 274 may send a command to the transmit data processor 260 specifying which MCS to use (e.g., based on channel conditions of the uplink), and the transmit data processor 260 may encode and modulate data from the data source 255 according to the specified MCS. It is to be appreciated that the transmit data processor 260 may perform additional processing on the data. The transmit data processor 260 outputs the data symbols to the frame builder 262.

The frame builder 262 constructs a frame, and inserts the received data symbols into a data payload of the frame. Exemplary frame structures or formats are discussed further below. The frame builder 262 outputs the frame to the transmit processor 264. The transmit processor 264 processes the frame for transmission. For example, the transmit processor 264 may support different transmission modes such as an OFDM transmission mode and an SC transmission mode. In this example, the controller 274 may send a command to the transmit processor 264 specifying which transmission mode to use, and the transmit processor 264 may process the frame for transmission according to the specified transmission mode.

In certain aspects, the transmit processor 264 may support multiple-output-multiple-input (MIMO) transmission. In these aspects, the access terminal 220 includes multiple antennas 270-1 to 270-N and multiple transceivers 266-1 to 266-N (e.g., one for each of the antennas 270-1 to 270-N). The transmit processor 264 may perform spatial processing on the incoming frame and provide a plurality of transmit frame streams for the plurality of antennas 270-1 to 270-N. The transceivers 266-1 to 266-N receive and process (e.g., convert to analog, amplify, filter, and frequency upconvert) the respective transmit frame streams to generate transmit signals for transmission via the antennas 270-1 to 270-N.

For receiving data, the access point 210 comprises a receive processor 242, and a receive data processor 244. In operation, the transceivers 226-1 to 226-N receive signals (e.g., from the access terminal 220) via the antennas 230-1 to 230-N, and process (e.g., frequency downconvert, amplify, filter, and convert to digital) the received signals.

The receive processor 242 receives the outputs of the transceivers 226-1 to 226-N, and processes the outputs to recover data symbols. For example, the access point 210 may receive data (e.g., from the access terminal 220) in a frame. In this example, the receive processor 242 may detect the start of the frame using the STF sequence in the preamble of the frame. The receive processor 242 may also use the STF for automatic gain control (AGC) adjustment. The receive processor 242 may also perform channel estimation (e.g., using the CEF in the preamble of the frame) and perform channel equalization on the received signal based on the channel estimation.

The receive processor 242 may also recover information (e.g., MCS scheme) from the header of the frame, and send the information to the controller 234. After performing channel equalization, the receive processor 242 may recover data symbols from the frame, and output the recovered data symbols to the receive data processor 244 for further processing. It is to be appreciated that the receive processor 242 may perform other processing.

The receive data processor 244 receives the data symbols from the receive processor 242 and an indication of the corresponding MCS scheme from the controller 234. The receive data processor 244 demodulates and decodes the data symbols to recover the data according to the indicated MCS scheme, and outputs the recovered data (e.g., data bits) to a data sink 246 for storage and/or further processing.

As discussed above, the access terminal 220 may transmit data using an OFDM transmission mode or a SC transmission mode. In this case, the receive processor 242 may process the receive signal according to the selected transmission mode. Also, as discussed above, the transmit processor 264 may support multiple-output-multiple-input (MIMO) transmission. In this case, the access point 210 includes multiple antennas 230-1 to 230-N and multiple transceivers 226-1 to 226-N (e.g., one for each of the antennas 230-1 to 230-N). Each of the transceivers 226-1 to 226-N receives and processes (e.g., frequency downconverts, amplifies, filters, converts to digital) the signal from the respective antenna. The receive processor 242 may perform spatial processing on the outputs of the transceivers 226-1 to 226-N to recover the data symbols.

For receiving data, the access terminal 220 comprises a receive processor 282, and a receive data processor 284. In operation, the transceivers 266-1 to 266-N receive signals (e.g., from the access point 210 or another access terminal) via the antennas 270-1 to 270-3, and process (e.g., frequency downconvert, amplify, filter, and convert to digital) the received signals.

The receive processor 282 receives the outputs of the transceivers 266-1 to 226-N, and processes the outputs to recover data symbols. For example, the access terminal 220 may receive data (e.g., from the access point 210 or another access terminal) in a frame, as discussed above. In this example, the receive processor 282 may detect the start of the frame using the STF sequence in the preamble of the frame. The receive processor 282 may also perform channel estimation (e.g., using the CEF in the preamble of the frame) and perform channel equalization on the received signal based on the channel estimation.

The receive processor 282 may also recover information (e.g., MCS scheme) from the header of the frame, and send the information to the controller 274. After performing channel equalization, the receive processor 282 may recover data symbols from the frame, and output the recovered data symbols to the receive data processor 284 for further processing. It is to be appreciated that the receive processor 282 may perform other processing.

The receive data processor 284 receives the data symbols from the receive processor 282 and an indication of the corresponding MCS scheme from the controller 274. The receive data processor 284 demodulates and decodes the data symbols to recover the data according to the indicated MCS scheme, and outputs the recovered data (e.g., data bits) to a data sink 286 for storage and/or further processing.

As discussed above, the access point 210 or another access terminal may transmit data using an OFDM transmission mode or a SC transmission mode. In this case, the receive processor 282 may process the receive signal according to the selected transmission mode. Also, as discussed above, the transmit processor 224 may support multiple-output-multiple-input (MIMO) transmission. In this case, the access terminal 220 includes multiple antennas 270-1 to 270-N and multiple transceivers 266-1 to 266-N (e.g., one for each the antennas 270-1 to 270-N). Each of the transceivers 266-1 to 266-N receives and processes (e.g., frequency downconverts, amplifies, filters, and converts to digital) the signal from the respective antenna. The receive processor 282 may perform spatial processing on the outputs of the transceivers 266-1 to 266-N to recover the data symbols.

As shown in FIG. 2, the access point 210 also comprises a memory 236 coupled to the controller 234. The memory 236 may store instructions that, when executed by the controller 234, cause the controller 234 to perform one or more of the operations described herein. Similarly, the access terminal 220 also comprises a memory 276 coupled to the controller 274. The memory 276 may store instructions that, when executed by the controller 274, cause the controller 274 to perform the one or more of the operations described herein.

Frame Format Common to the Enhanced Frames

FIGS. 3A-3D show exemplary frames 300, 310, 320, and 330 in accordance with certain aspects of the present disclosure. Each of the frames 300, 310, 320, and 330 comprises a legacy short training field (L-STF), a legacy channel estimation field (CEF), and a legacy header (L-Header). For backward compatibility purposes, the L-STF, L-CEF, and L-Header can be decoded by a receiving device (e.g., user device 106) operating under a legacy protocol, such as IEEE 802.11ad. With regard to the new frames 300, 310, 320, and 330 under a proposed new 802.11ay protocol, a legacy device may decode the 802.11ad preamble (L-STF and L-CEF) and header portion (L-Header) of each of the new frames 300, 310, 320, and 330 in order to calculate a network allocation vector (NAV) to determine the length of the new frame for transmission collision avoidance purposes.

Each of the exemplary frames 300, 310, 320, and 330 further comprises an Extended Directional Multigigabit (EDMG) Header, which may have attached data. The EDMG Header provides information concerning the new frames 300, 310, 320, and 330. Additionally, some or the entire data payload may be attached to the EDMG Header, as discussed above.

The EDMG Header may include: (1) a data payload length of the frame; (2) number of LDPC data blocks attached to the EDMG Header of the frame; (3) number of spatial streams transmitted in the frame; (4) the number of bonded channels in the frame; (5) the channel offset indicating the first (lowest frequency) channel of the bonded channels; (6) the MCS used for the data in the 802.11ay data payload; (7) the length (short, normal, or long) of the guard interval (GI) in each data (FFT) block in the 802.11ay data payload; (8) the length (short or long) of the data (FFT) block in the 11ay data payload; (9) the length (short or long) of the encoded (LDPC) block(s) in the data (FFT) block in the 11ay data payload; (10) a long CEF field to signal a long 802.11ay CEF sequence for MIMO; (11) a power difference field to indicate a power difference between the L-STF, L-CEF, L-Header, and EDMG Header with attached data, and the 802.11ay portion (STF: AGC+initial timing, CEF, Data Payload) for a WB-SC transmission mode frame transmitted via a plurality of bonded channels; (12) reserved bits; (13) proprietary bits; and (14) a CRC field.

Each of the new frames 310, 320, and 330 includes an 802.11ay portion that may include three (3) sections: an EDMG STF (also referred to as NG60 STF), an EDMG CEF (also referred to as NG60 CES), and a EDMG Data Payload. The 802.11ay portion may also include an optional beam training sequence (TRN). The EDMG STF may be built using Golay codes (as in the legacy STF). During this period, a receiver is expected to complete the following: automatic gain control (AGC), timing and frequency acquisition. The EDMG STF may use Ga and Gb in the same order as the 802.11ad. Optionally, the Golay codes can be 128 (as in 802.11ad) or 256 or 512 in length. The EDMG CEF may also be built using the same Golay construction as the L-CEF sequence of 802.11ad, only replacing the 128 sequences with 256 sequences for double channel, 512 sequences for triple and quad channels, and 1024 for 5-8 channels.

The EDMG Data Payload may be modulated and encoded using MCSs similar to the 802.11ad protocol with the following changes: (1) in addition to BPSK, QPSK and 16QAM, higher modulations are defined (and can be used): 64QAM, 64APSK, 128APSK, 256QAM, and 256APSK; (2) data symbol (FFT) block can be 512 (as in 802.11ad) or 1024, 1536 or 2048; and (3) guard interval (GI) may also be Golay code as in 802.11ad, with more length options supported: 64 (as in 802.11ad), 32, 96, 128, 192, 256, 384, or 512.

The exemplary frame 300 shown in FIG. 3A is the extension of 802.11ay for a single channel case. The frame 300 comprises the legacy preamble (L-STF and L-CEF), legacy Header (L-Header), and new EDMG Header. The frame 300 facilitates the new MCSs of the 802.11ay protocol with the transmission of the 802.11ay STF (EDMG STF) and Data Payload. Note that the 802.11ay CEF (EDMG CEF) is not present since for a single channel, there is no need for re-estimating the channel (i.e., the legacy L-CEF is used). The EDMG STF is present since a receiver may improve the receiver chain setup for higher constellations of the 802.11ay modulation.

The exemplary frame 310 shown in FIG. 3B is the extension of 802.11ay for a two channel bonding case. The frame 310 comprises a first (legacy) channel (e.g., CH1) for transmitting the legacy preamble (L-STF and L-CEF), L-Header, and EDMG Header. The frame 310 further comprises a second (legacy) channel (e.g., CH2) for transmitting the legacy preamble (L-STF and L-CEF), L-Header, and EDMG Header. Note that the attached data following the EDMG Header of the first channel (CH1) may be different than the attached data following the EDMG Header of the second channel (CH2). The information fields of the EDMG Header may be configured as per EDMG Header format previously discussed. The 802.11ay portion of the frame 310, namely the EDMG STF, EDMG CEF, EDMG Data Payload, and optional TRN, are transmitted via a bonded channel comprising at least a portion of each of the first and second channels (e.g., CH1+CH2). As previously discussed, the transmission of the L-STF AND L-CEF, L-Header, and EDMG Header uses an MCS specified in legacy 802.11ad, and the transmission of the 802.11ay portion (EMDG STF, EDMG CEF, and Data Payload) uses an MCS specified in 802.11ay, which may be different from the MCS specified in legacy 802.11ad.

The exemplary frame 320 shown in FIG. 3C is the extension of 802.11ay frame for a three (3) channel bonding case (e.g., CH1+CH2+CH3). The exemplary frame 330 shown in FIG. 3D is the extension of 802.11ay frame for the four (4) channel bonding case (e.g., CH1+CH2+CH3+CH4). From FIGS. 3A-3D, it is clear that the frame format is extendable to any number of channels (e.g., five, six or seven channels).

FIG. 3E illustrates an exemplary transmission power profile for any of the exemplary frames 300, 310, 320, and 330 in accordance with certain aspects of the disclosure. In this example, the transmit power for the L-STF, L-CEF, L-Header, and EDMG Header (with attached data) of the aggregate channels is backed off to reduce peak to average power ratio (PAPR). The transmit power for the 802.11ay portion (EDMG STF, EDMG CEF, and Data Payload) is increased for better detection at a receiver. The power difference may be indicated in the EDMG Header. The L-Header may also be modified to include information indicating the power difference. For example, this information may be included in least significant bits (LSBs) of the data length field of the L-Header, and/or in the reserved bit field of the L-Header.

The vertical dashed line extending from the transmission power profile in FIG. 3E indicates the transition between the different power levels according to certain aspects of the present disclosure. In this example, the transmit power for the L-STF, L-CEF, L-Header, and EDMG Header (with attached data) of each frame is lower than the transmit power for the 802.11ay portion (EDMG STF, EDMG CEF, and Data Payload). In certain aspects, the portion of each frame to the left of the dashed line may be transmitted using SC transmission mode for each channel. This may be done for backwards compatibility with legacy devices. The portion of each frame to the right of the dashed line (802.11ay portion) may be transmitted using ODFM transmission mode.

The exemplary frames 310, 320 and 330 may be extended to support single user MIMIO (SU-MIMO) and multiple user MIMO (MU-MIMO). In MIMO cases, the EDMG STF and EDMG CEF may be different and an additional header (referred to as EDMG Header-B) may be added to support MIMO.

Figure 4A:
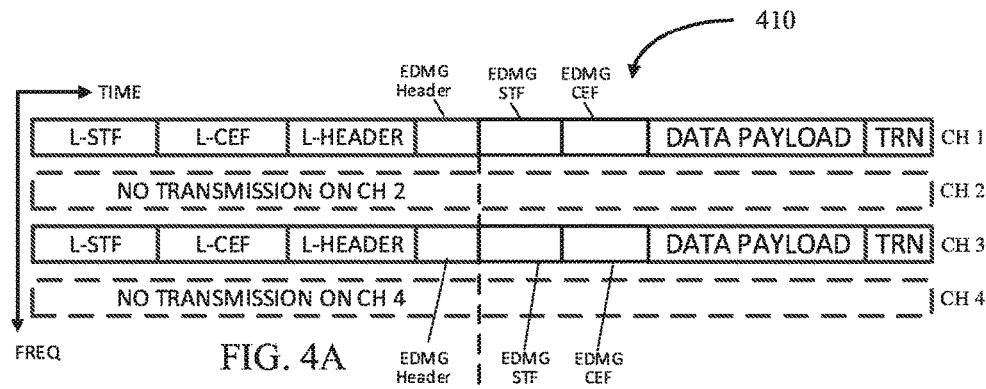
FIGS. 4A-4C illustrate exemplary frames for transmission on non-adjacent channels in accordance with certain aspects of the present disclosure.
Figure 4B:
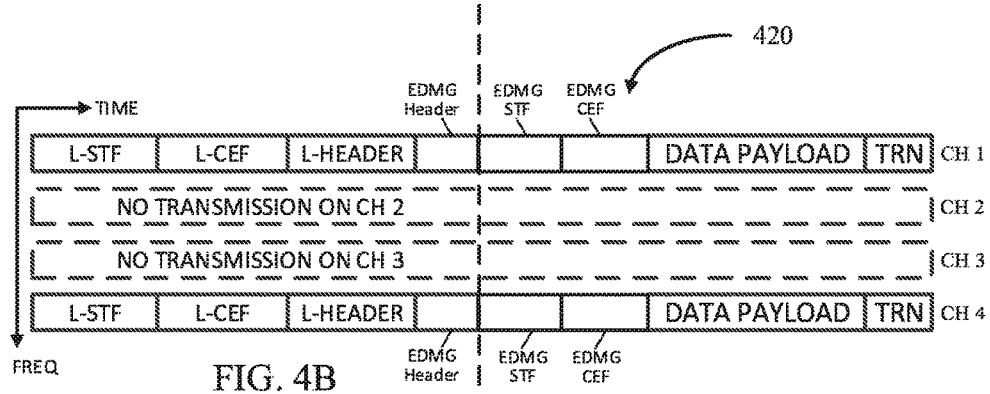
Figure 4C:
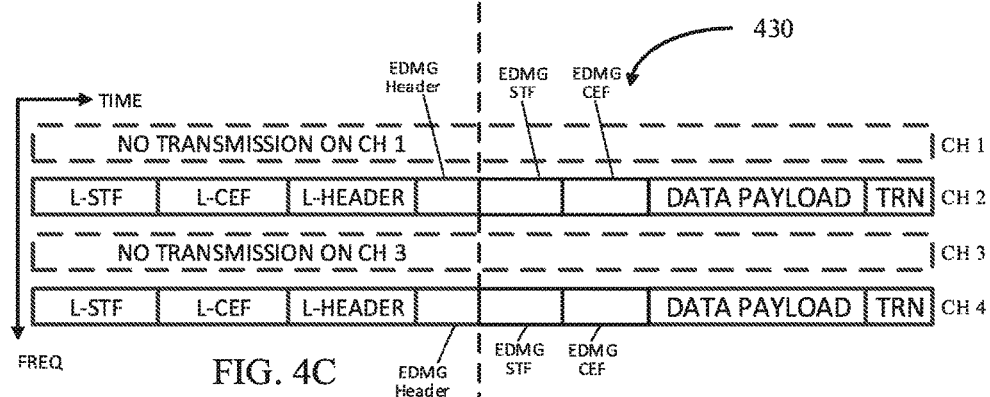

FIGS. 4A-4C illustrate exemplary frames 410, 420, and 430 for transmission on non-adjacent (non-contiguous) channels in accordance with certain aspects of the disclosure. Each of the frames 410, 420 and 430 may maintain the legacy 802.11ad preamble (L-STF and L-CEF) and L-Header as prefix in order to be backwards compliant. The legacy 802.11ad preamble (L-STF and L-CEF) and L-Header may be transmitted with some backoff to reduce peak to average power ratio (PARP), as discussed further below.

In this example, frame 410 is an example of a two channel aggregate (non-adjacent) frame in accordance with the proposed new protocol (802.11ay). Transmission of the frame 410 comprises a first channel (CH1) transmission including the L-STF, the L-CEF, the L-Header, the EDMG Header with the optional attached data, the EDMG STF, the EDMG CEF, the Data Payload, and optional TRN. The first channel (CH1) may have a bandwidth of substantially 1.76 GHz. Transmission of the frame 410 further comprises a third channel (CH3) transmission including the L-STF, the L-CEF, the L-Header, the EDMG Header with the optional attached data, the EDMG STF, the EDMG CEF, the Data Payload, and optional TRN. The transmission of the legacy preamble and header in the first and third channels (CH1 and CH3) are for 802.11ad backward compatibility. The data attached to the EDMG Header for the first channel (CH1) may be different than the data attached to the EDMG Header of the third channel (CH3). The third channel (CH3) may also have a bandwidth of 1.76 GHz. Frame 410 does not include transmissions via channels CH2 and CH4.

Frame 420 is an example of a two channel aggregate (non-adjacent) frame in accordance with the proposed new protocol (802.11ay). Similar to frame 410, transmission of the frame 420 comprises a first channel (CH1) transmission including the L-STF, the L-CEF, the L-Header, the EDMG Header with the optional attached data, the EDMG STF, the EDMG CEF, the Data Payload, and optional TRN. The transmission of the frame 420 further comprises a fourth channel (CH4) transmission including the L-STF, the L-CEF, the L-Header, the EDMG Header with the optional attached data, the EDMG STF, the EDMG CEF, the Data Payload, and optional TRN. Frame 420 does not include transmissions via channels CH2 and CH3.

Frame 430 is an example of a two channel aggregate (non-adjacent) frame in accordance with the proposed new protocol (802.1lay). Transmission of the frame 430 comprises a second channel (CH2) transmission including the L-STF, the L-CEF, the L-Header, the EDMG Header with the optional attached data, the EDMG STF, the EDMG CEF, the Data Payload, and optional TRN. Transmission of the frame 430 further comprises a fourth channel (CH4) transmission including the L-STF, the L-CEF, the L-Header, the EDMG Header with the optional attached data, the EDMG STF, the EDMG CEF, the Data Payload, and optional TRN. Frame 430 does not include transmissions via channels CH1 and CH3.

Figure 4D:
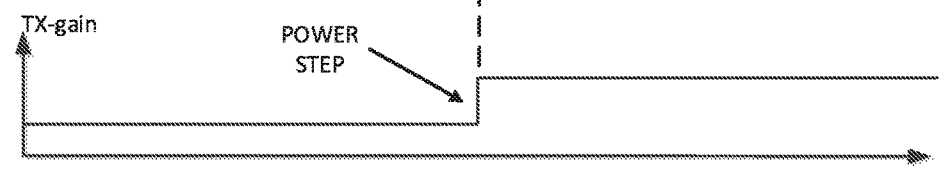
FIG. 4D illustrates an exemplary transmit power profile for the exemplary frames shown in FIGS. 4A-4C in accordance with certain aspects of the present disclosure.

FIG. 4D illustrates an exemplary transmission power profile for any of the exemplary frames 410, 420 and 430 in accordance with certain aspects of the disclosure. In this example, the transmit power for the L-STF, L-CEF, L-Header, and EDMG Header (with attached data) of the aggregate channels is backed off to reduce peak to average power ratio (PAPR). The transmit power for the 802.11ay portion (EDMG STF, EDMG CEF, and Data Payload) is increased for better detection at a receiver. The vertical dashed line extending from the transmission power profile in FIG. 4D indicates the transition between the different power levels according to certain aspects of the present disclosure. In this example, the transmit power to the left of the dashed line is lower than the transmit power to the right of the dashed line.

Figure 4E:
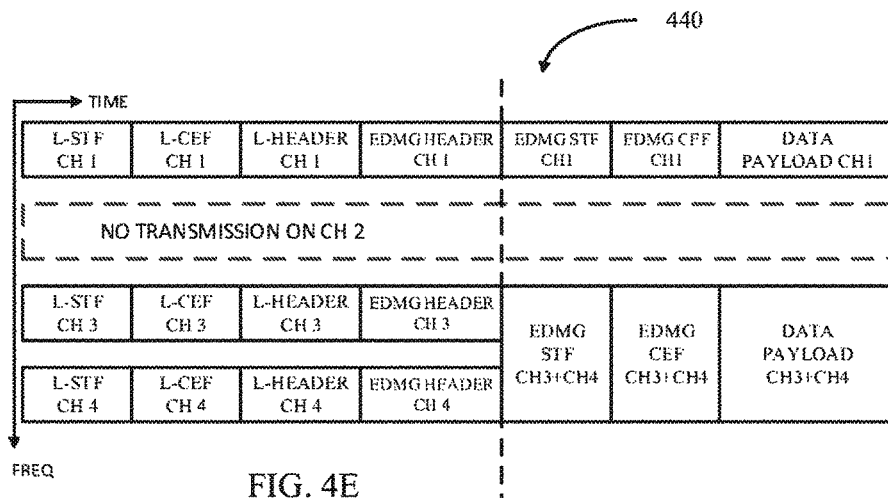
FIGS. 4E and 4F illustrate exemplary frames for transmission on two adjacent channels and a single non-adjacent channel in accordance with certain aspects of the present disclosure.
Figure 4F:
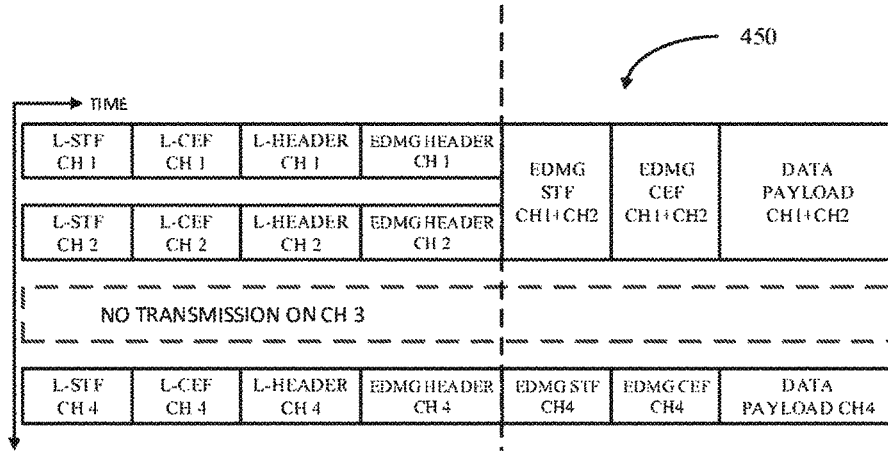

FIGS. 4E and 4F illustrate additional exemplary frames 440 and 450 according to certain aspects of the present disclosure. Each of these frames 440 and 450 includes a transmission via a bonded channel and a non-adjacent single channel. For example, transmission of the frame 440 includes a first transmission via non-adjacent single channel CH1, and a second transmission via a bonded channel CH3+CH4. In this example, there is no transmission via channel CH2. Transmission of the frame 440 includes time-aligned transmission of the legacy portion (L-STF, L-CEF, and L-Header) and the EDMG Header via separate channels CH3 and CH4. The transmission of the frame 440 also includes transmission of the EDMG STF, EDMG CEF, and Data Payload via frequency bonded channels CH3+CH4.

Transmission of frame 450 includes a first transmission via a bonded channel CH1+CH2, and a second transmission via a single non-adjacent channel CH4. In this example, there is no transmission via channel CH3. The transmission of the frame 450 includes time-aligned transmission of the legacy portion (L-STF, L-CEF, and L-Header) and the EDMG Header via separate channels CH1 and CH2. The transmission of the frame 450 also includes transmission of the EDMG STF, EDMG CEF, and Data Payload via frequency bonded channels CH1+CH2.

Figure 4G:
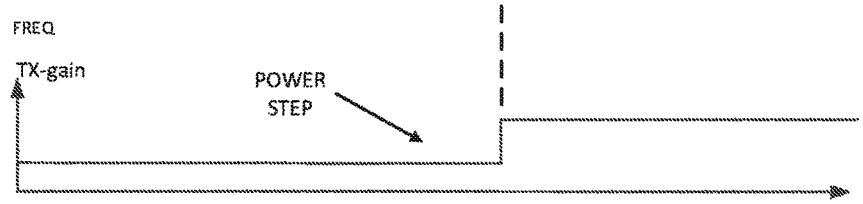
FIG. 4G illustrates an exemplary transmit power profile for the exemplary frames shown in FIGS. 4E and 4F in accordance with certain aspects of the present disclosure.

FIG. 4G illustrates an exemplary transmission power profile for any of the exemplary frames 440 and 450 in accordance with certain aspects of the disclosure. In this example, the transmit power for the L-STF, L-CEF, L-Header, and EDMG Header (with attached data) of the aggregate channels is backed off to reduce peak to average power ratio (PAPR). The transmit power for the 802.11ay portion (EDMG STF, EDMG CEF, and Data Payload) is increased for better detection at a receiver. The vertical dashed line extending from the transmission power profile in FIG. 4G indicates the transition between the different power levels according to certain aspects of the present disclosure. In this example, the transmit power to the left of the dashed line is lower than the transmit power to the right of the dashed line.

Re-Channelization of Sub-Carriers

Figure 5:
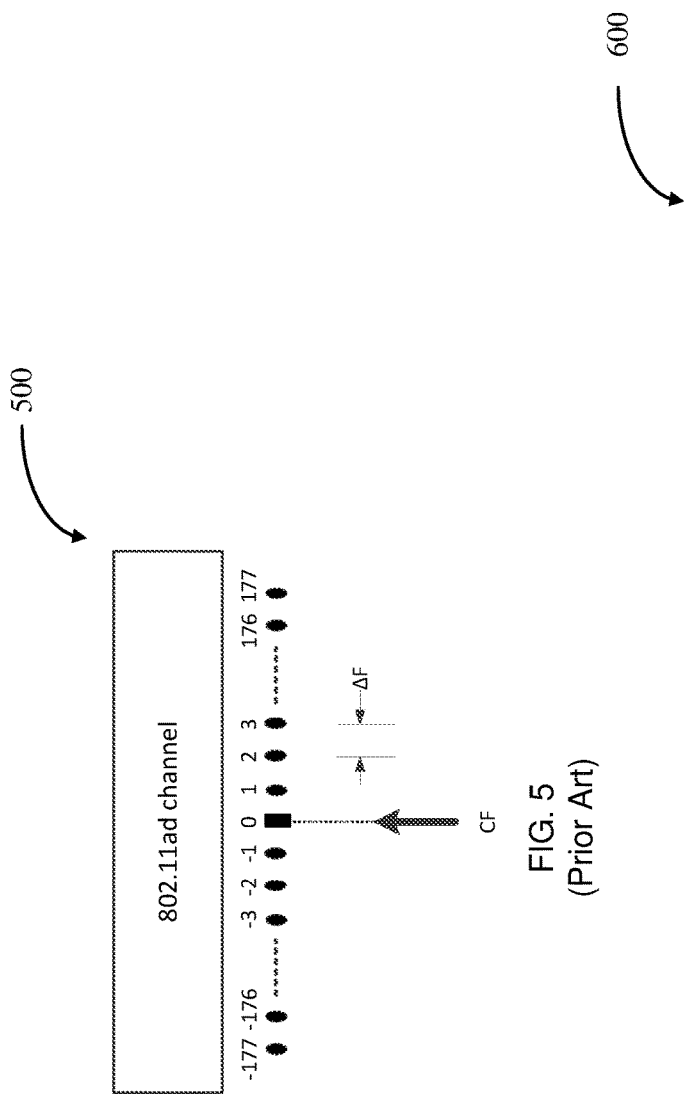
FIG. 5 illustrates a center frequency and sub-carrier frequencies for a channel according to a legacy 802.11ad standard.

The IEEE 802.11ad standard defines four channels and two transmission modes with one being the OFDM transmission mode discussed above. In each channel, the OFDM sampling rate is 2.64 GHz using a Fast Fourier Transform (FFT) of 512. Hence, the OFDM sub-carriers are spaced 5.15625 MHz (2.64 GHz/512) apart, with one of the sub-carriers being exactly at the channel center frequency. This is illustrated in FIG. 5, which shows the sub-carriers for one of the channels 500 according to the 802.11ad standard. The horizontal axis in FIG. 5 corresponds to frequency and the spacing of the OFDM sub-carriers is denoted by ΔF. As shown in FIG. 5, one of the sub-carriers (index 0) is located at the center frequency (CF) of the channel 500. In FIG. 5, the sub-carrier at the center frequency of the channel 500 is represented by a rectangle and the other sub-carriers of the channel 500 are represented by ovals. Further details may be found, for example, in IEEE P802.11ad/D9.0, July 2012, sections 21.3.4 and 21.5.3.2.6.

Figure 6:
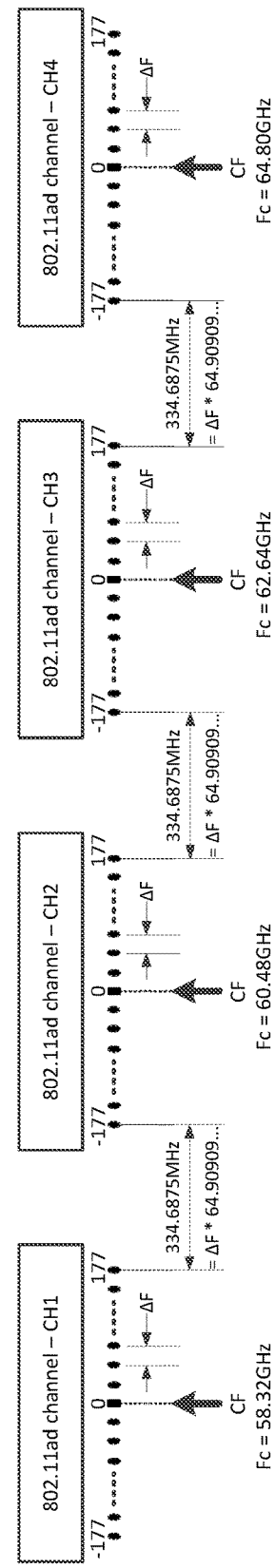
FIG. 6 illustrates center frequencies and sub-carrier frequencies for four channels according to a legacy 802.11ad standard.

FIG. 6 shows the sub-carriers for all four channels 600 according to the 802.11ad standard, where the horizontal axis corresponds to frequency. In FIG. 6, the sub-carrier at the center frequency of each channel is represented by a rectangle, and the other sub-carriers of each channel are represented by ovals. The channel spacing is 2.16 GHz (i.e., spacing between the center frequencies of two adjacent channels). The channel spacing is not an integer multiple of the sub-carrier spacing. This can be demonstrated by dividing the channel spacing by the sub-carrier spacing (2.16 GHz/5.15625 MHz=418. 90909090909 . . . ), which results in a non-integer number. Consequently, the spacing between the edge sub-carriers of two adjacent channels is not an integer multiple of the sub-carrier spacing. More particularly, the spacing between the edge sub-carriers of two adjacent channels is 2160-354*ΔF=334.6875 MHz, which is equal to 64.9090909090909 . . . times ΔF (sub-carrier spacing). This is illustrated in FIG. 6.

In the new 802.11ay standard for the 60 GHz band, channel-bonding will be used to increase the link throughput, as discussed above. However, the fact that the channel spacing is a non-integer multiple of the sub-carrier spacing limits the ability to process two or more channels with a single Fast Fourier Transform (FFT).

Figures 7, 8:
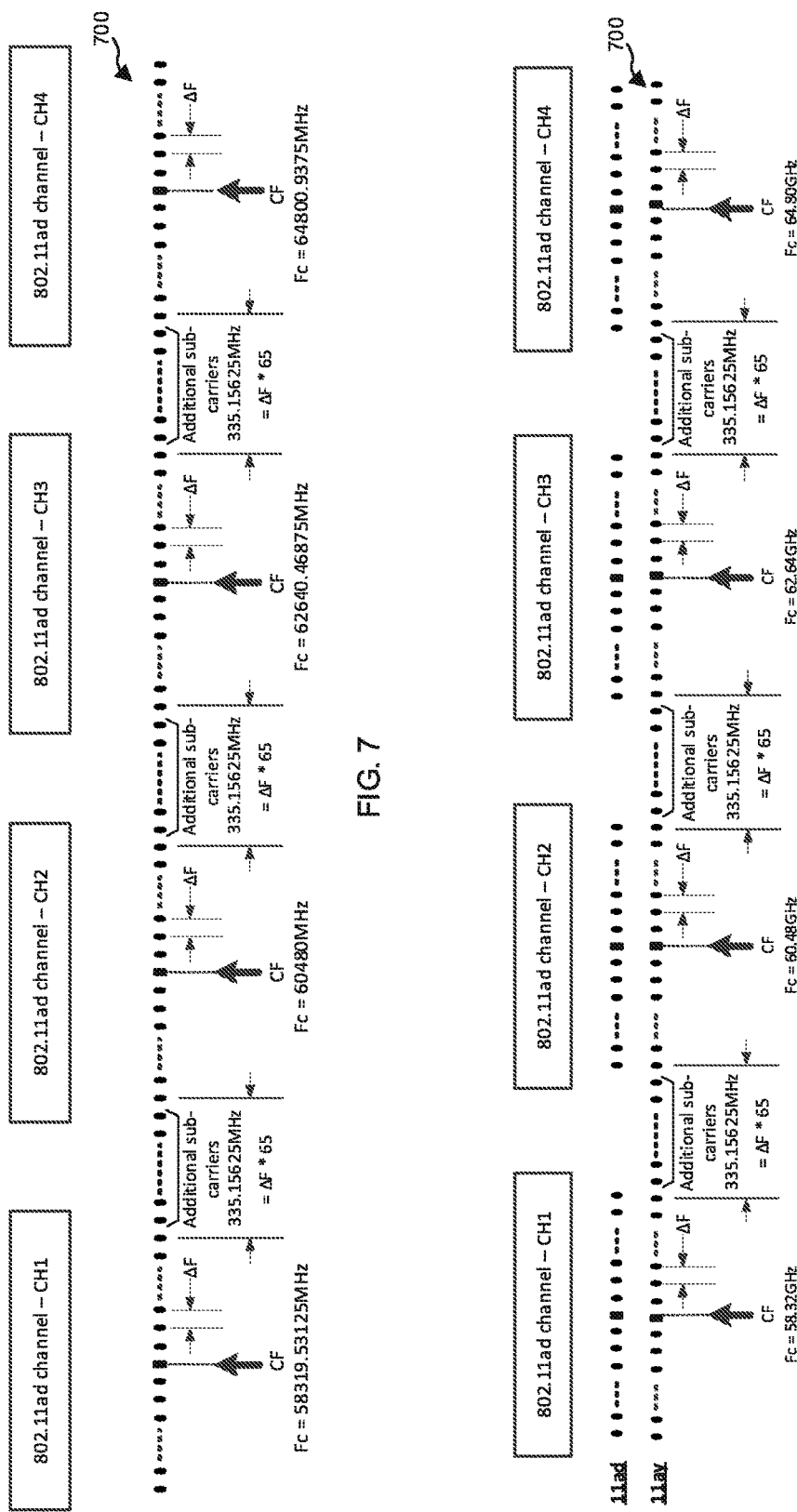
FIG. 7 illustrates center frequencies and sub-carrier frequencies for four channels aligned with a frequency grid in accordance with certain aspects of the present disclosure.
FIG. 8 illustrates the center frequencies and sub-carrier frequencies for the four channels aligned with the frequency grid relative to the center frequencies and sub-carrier frequencies for the four channels according to the legacy 802.11ad standard in accordance with certain aspects of the present disclosure.

To address this, the sub-carriers in all bands may be redefined to be on the same frequency grid according to certain aspects of the present disclosure. The frequency grid may comprise a plurality of evenly spaced frequency positions, in which each sub-carrier is aligned with a respective one of the frequency positions on the grid. An example of this is shown in FIG. 7, which shows an exemplary frequency grid 700 for all channels (four channels in this example). The frequency grid 700 comprises evenly spaced frequency positions (spaced apart by the sub-carrier spacing, which may be 5.15625 MHz). The sub-carriers for each channel are aligned with respective frequency positions on the frequency grid 700. In the example in FIG. 7, the center frequencies of the channels are: 58319.53125, 60480, 62640.46875 and 64800.9375 MHz, although it is to be appreciated that the present disclosure is not limited to this example. By aligning the sub-carriers of the channels with the frequency grid 700, the spacing between the edge sub-carriers of two adjacent channels is an integer multiple of the sub-carrier spacing (65 in the example in FIG. 7). As shown in FIG. 7, additional sub-carriers in the gaps between the channels may be also aligned with respective frequency positions on the frequency grid 700. This allows the sub-carriers of a bonded channel (which may comprise two or more of the channels and one or more of the gaps shown in FIG. 7) to be evenly spaced and processed with a single FFT, as discussed further below. In FIG. 7, the sub-carrier at the center frequency of each channel is represented by a rectangle, and the other sub-carriers of each channel are represented by ovals.

Since the legacy 802.11ad standard may not be changed, the sub-carrier frequencies may be redefined only for the 802.11ay portion of the frame (e.g., EDMG STF, EDMG CEF and Data Pay Load). In this regard, the legacy portion of an 802.11ay frame (e.g., any one of the frames in FIGS. 3A-3D, 4A-4C, 4E and 4F) may be transmitted (e.g., in the SC mode) using the legacy (802.11ad) channel center frequencies: 58.32, 60.48, 62.64 and 64.80 GHz.

In this regard, a transmitter may transmit a legacy portion of an 802.11ay frame using the legacy channel center frequencies. The transmitter may then perform a small frequency shift according to its center frequency (e.g., dependent on channel and channel bonding) to transmit the 802.11ay portion using the redefined channel center frequencies and sub-carrier frequencies (e.g., shown in FIG. 7).

Similarly, a receiver may receive the legacy portion of an 802.11ay frame using the legacy channel center frequencies. The receiver may then perform a small frequency shift according to its center frequency (e.g., dependent on channel and channel bonding) to receive the 802.11ay portion using the redefined channel center frequencies and sub-carrier frequencies. The frequency shift (change) may be performed on the received signal by a small rotation unit that most receivers already have for frequency correction (e.g., to correct for carrier frequency offset between the transmitter and the receiver). Hence, in most receivers, the frequency shift may have little or no hardware impact. The frequency shift may be bounded by ½ of a sub-carrier spacing (~2.5 MHz) or less than 1 MHz in certain embodiments, as discussed further below. Thus, the frequency shift may be small.

In this regard, FIG. 8 shows the legacy sub-carrier frequencies (top row) and an example of redefined sub-carrier frequency frequencies (bottom row). FIG. 8 also shows the legacy channel center frequencies: 58.32, 60.48, 62.64 and 64.80 GHz. In this example, a receiver may receive a first portion of an 802.11ay frame using the legacy channel center frequencies. The first portion of the frame may include L-STF, L-CEF, L-Header and EDMG Header. The receiver may then perform a frequency shift to receive a second portion of the 802.11ay frame using the redefined channel center frequencies and sub-carrier frequencies. The second portion of the frame may include the EDMG STF, EDMG CEF and Data Payload. In FIG. 8, the sub-carrier at the center frequency of each channel is represented by a rectangle, and the other sub-carriers of each channel are represented by ovals. As shown in FIG. 8, the required frequency shift is small.

The legacy 802.11ad subcarriers for each channel are located at: CFi+(−177 . . . 177)*5.15625 MHz, where CFi is the center frequency of the channel. For example, for CH1 the subcarriers frequencies are: 57.40734375, 57.4125 . . . 59.2275, 59.23265625 GHz. In certain aspects, the legacy center frequency for CH2 is kept in place for simplicity, while the center frequencies of the other channels are redefined (although it is to be appreciated that the center frequency of another one of the channels may be kept in place instead). This may be accomplished by aligning one of the frequency positions of the frequency grid 700 with the legacy center frequency for CH2 (an example of which is shown in FIG. 8). This option results in a max frequency shift of less than 1 MHz over the entire band.

For this example, the new center frequencies for CH1, CH3 and CH4 for OFDM are computed by offsets of −419, 419 and 2*419 SCS from the CH2 center frequency, where SCS is a sub-carrier spacing. The center frequencies of all channels are: 58319.53125, 60480, 62640.46875 and 64800.9375 MHz. In this example, SCS (sub-carrier spacing) is defined as 2640/512 MHz, and the OFDM sub-carrier indexes (denote by i) for each channel are: −177 . . . 177. Thus, in this example, the sub-carrier frequencies (Fi) for the four channels are as follows:

CH1: $Fi=60480-419*SCS+i*SCS$

CH2: $Fi=60480+i*SCS$

CH3: $Fi=60480+419*SCS+i*SCS$

CH4: $Fi=60480+2*419*SCS+i*SCS$

FIG. 8 shows an example of re-channelization using the above example. The 802.11ad sub-carrier frequencies (top row) are also shown for reference. All of the sub-carriers on the 802.11ay row (bottom row), including the sub-carriers in the gaps between the channels, are evenly spaced by $\Delta F$. Note that all sub-carriers except those in CH2 are not aligned with the 802.11ad sub-carriers, and the CFs are not aligned to any 802.11ad sub-carrier (except CH2 which is by design in this example).

The present disclosure may be extended to additional channels. For example, the frequency grid 700 may be extended to five, six, seven or more channels. In this example, the sub-carrier frequencies (Fi) for additional channels may be given as follows:

CH5: $Fi=60480+3*419*SCS+i*SCS$

CH6: $Fi=60480+4*419*SCS+i*SCS$

CH7: $Fi=60480+5*419*SCS+i*SCS$

In the above example, the center frequency of each of the additional channels (CH5-CH7) is offset from the center frequency of CH2 by an integer multiple of 419*SCS. This is because the frequency grid 700 is aligned with the legacy center frequency for CH2 in this example. However, it is to be appreciated that the frequency grid 700 may be aligned with another legacy center frequency (e.g., for the case of five or more channels). For example, the frequency grid 700 may be aligned with the legacy center frequency for CH3, which is 62640 MHz. In this example, the sub-carrier frequencies (Fi) for seven channels are as follows:

CH1: $Fi=62640-2*419*SCS+i*SCS$

CH2: $Fi=62640-419*SCS+i*SCS$

CH3: $Fi=62640+i*SCS$

CH4: $Fi=62640+419*SCS+i*SCS$

CH5: $Fi=62640+2*419*SCS+i*SCS$

CH6: $Fi=62640+3*419*SCS+i*SCS$

CH7: $Fi=62640+4*419*SCS+i*SCS$

In another example, the frequency grid 700 may be aligned with the legacy center frequency for CH4, which is 64800 MHz.

In another example, the offset between the center frequencies of the channels is 418 instead of 419. Using the same notation as the previous example, the sub-carrier frequencies (Fi) for the four channels in this example are as follows:

CH1: $Fi=60480-418*SCS+i*SCS$

CH2: $Fi=60480+i*SCS$

CH3: $Fi=60480+418*SCS+i*SCS$

CH4: $Fi=60480+2*418*SCS+i*SCS$

An advantage of this example is that 418 is not a prime number. This makes it easier to evenly space pilots on the sub-carriers.

Figure 9:
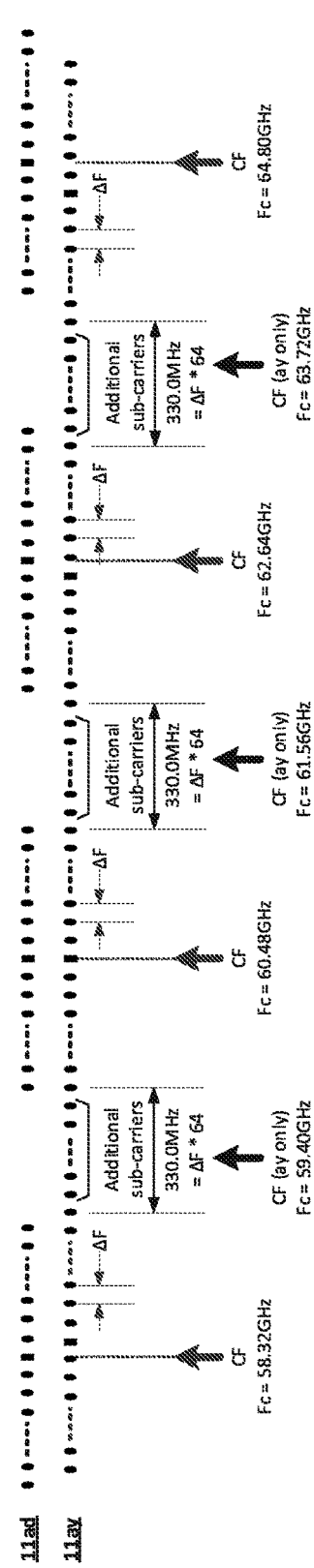
FIG. 9 illustrates an example in which the center frequencies of the four channels are offset by 418 sub-carriers in accordance with certain aspects of the present disclosure.

FIG. 9 shows an example of re-channelization using the above example. The 802.11ad sub-carrier frequencies (top row) are also shown for reference. All of the sub-carriers on the 802.11ay row (bottom row), including the sub-carriers in the gaps between the channels, are evenly spaced by $\Delta F$. In FIG. 9, the sub-carrier at the center frequency of each channel is represented by a rectangle, and the other sub-carriers of each channel are represented by ovals. As shown in FIG. 9, in this example, the center frequencies for channels CH1, CH3 and CH4 on 802.11ay are shifted inward relative to the center frequencies for channels CH1, CH3 and CH4 on 802.11ad. In this example, the center frequency for CH2 on 802.11ay is aligned with the center frequency for CH2 on 802.11ad, although it is to be appreciated that this need not be the case. In this example, the maximum frequency shift may be less than 2*SCS.

As discussed above, the present disclosure may be extended to additional channels. For example, the frequency grid 700 may be extended to five, six, seven or more channels. In this example, the sub-carrier frequencies (Fi) for additional channels may be given as follows:

CH5: $Fi=60480+3*418*SCS+i*SCS$

CH6: $Fi=60480+4*418*SCS+i*SCS$

CH7: $Fi=60480+5*418*SCS+i*SCS$

In the above example, the center frequency of each of the additional channels (CH5-CH7) is offset from the center frequency of CH2 by an integer multiple of 418*SCS. This is because the frequency grid 700 is aligned with the legacy center frequency for CH2 in this example. However, it is to be appreciated that the frequency grid 700 may be aligned with another legacy center frequency (e.g., for the case of five or more channels). For example, the frequency grid 700 may be aligned with the legacy center frequency for CH3, which is 62640 MHz. In this example, the sub-carrier frequencies (Fi) for seven channels are as follows:

CH1: $Fi=62640-2*418*SCS+i*SCS$

CH2: $Fi=62640-418*SCS+i*SCS$

CH3: $Fi=62640+i*SCS$

CH4: $Fi=62640+418*SCS+i*SCS$

CH5: $Fi=62640+2*418*SCS+i*SCS$

CH6: $Fi=62640+3*418*SCS+i*SCS$

CH7: $Fi=62640+4*418*SCS+i*SCS$

In another example, the frequency grid 700 may be aligned with the legacy center frequency for CH4, which is 64800 MHz.

In another example, the offset between the center frequencies of the channels is 420 instead of 419. Using the same notation as the first example, the sub-carrier frequencies (Fi) for the four channels in this example are as follows:

CH1: $Fi=60480-420*SCS+i*SCS$

CH2: $Fi=60480+i*SCS$

CH3: $Fi=60480+420*SCS+i*SCS$

CH4: $Fi=60480+2*420*SCS+i*SCS$

An advantage of this example is that 420 is not a prime number. This makes it easier to evenly space pilots on the sub-carriers.

Figure 10:
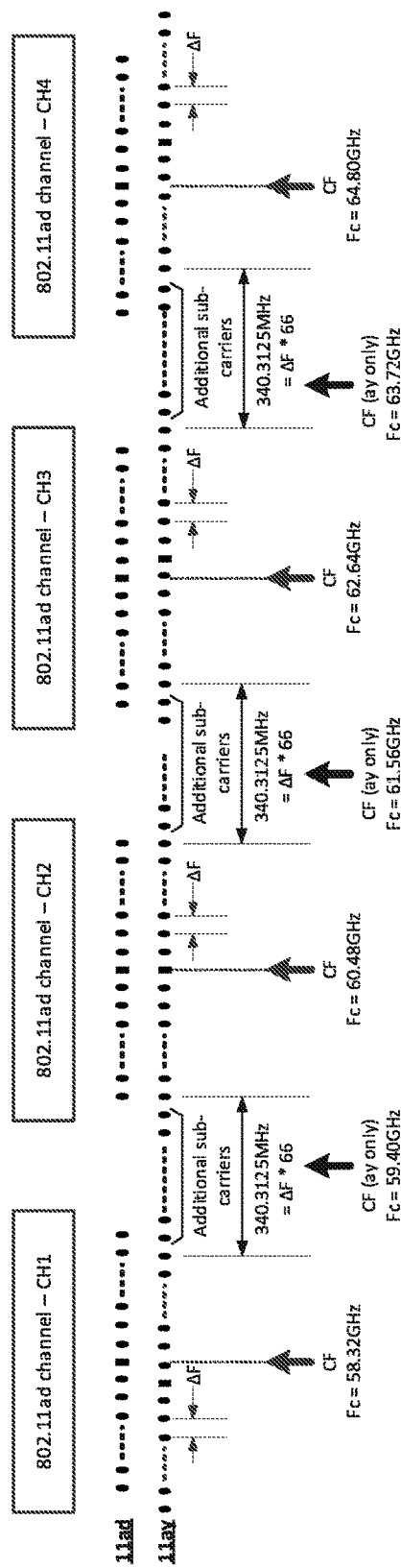
FIG. 10 illustrates an example in which the center frequencies of the four channels are offset by 420 sub-carriers in accordance with certain aspects of the present disclosure.

FIG. 10 shows an example of re-channelization using the above example. The 802.11ad sub-carrier frequencies (top row) are also shown for reference. All the sub-carriers on the 802.11ay row (bottom row), including the sub-carriers in the gaps between the channels, are evenly spaced by ΔF. In FIG. 10, the sub-carrier at the center frequency of each channel is represented by a rectangle, and the other sub-carriers of each channel are represented by ovals. As shown in FIG. 10, in this example, the center frequencies for channels CH1, CH3 and CH4 on 802.11ay are shifted outward relative to the center frequencies for channels CH1, CH3 and CH4 on 802.11ad. In this example, the center frequency for CH2 on 802.11ay is aligned with the center frequency for CH2 on 802.11ad, although it is to be appreciated that this need not be the case. In this example, the maximum frequency shift may be less than 3*SCS.

As discussed above, the present disclosure may be extended to additional channels. For example, the frequency grid 700 may be extended to five, six, seven or more channels. In this example, the sub-carrier frequencies (Fi) for additional channels may be given as follows:

CH5: $Fi=60480+3*420*SCS+i*SCS$

CH6: $Fi=60480+4*420*SCS+i*SCS$

CH7: $Fi=60480+5*420*SCS+i*SCS$

In the above example, the center frequency of each of the additional channels (CH5-CH7) is offset from the center frequency of CH2 by an integer multiple of 420*SCS. This is because the frequency grid 700 is aligned with the legacy center frequency for CH2 in this example. However, it is to be appreciated that the frequency grid 700 may be aligned with another legacy center frequency (e.g., for the case of five or more channels). For example, the frequency grid 700 may be aligned with the legacy center frequency for CH3, which is 62640 MHz. In this example, the sub-carrier frequencies (Fi) for seven channels are as follows:

CH1: $Fi=62640=2*480*SCS+i*SCS$

CH2: $Fi=62640-420*SCS+i*SCS$

CH3: $Fi=62640+i*SCS$

CH4: $Fi=62640+420*SCS+i*SCS$

CH5: $Fi=62640+2*420*SCS+i*SCS$

CH6: $Fi=62640+3*420*SCS+i*SCS$

CH7: $Fi=62640+4*420*SCS+i*SCS$

In another example, the frequency grid 700 may be aligned with the legacy center frequency for CH4, which is 64800 MHz.

Figure 11:
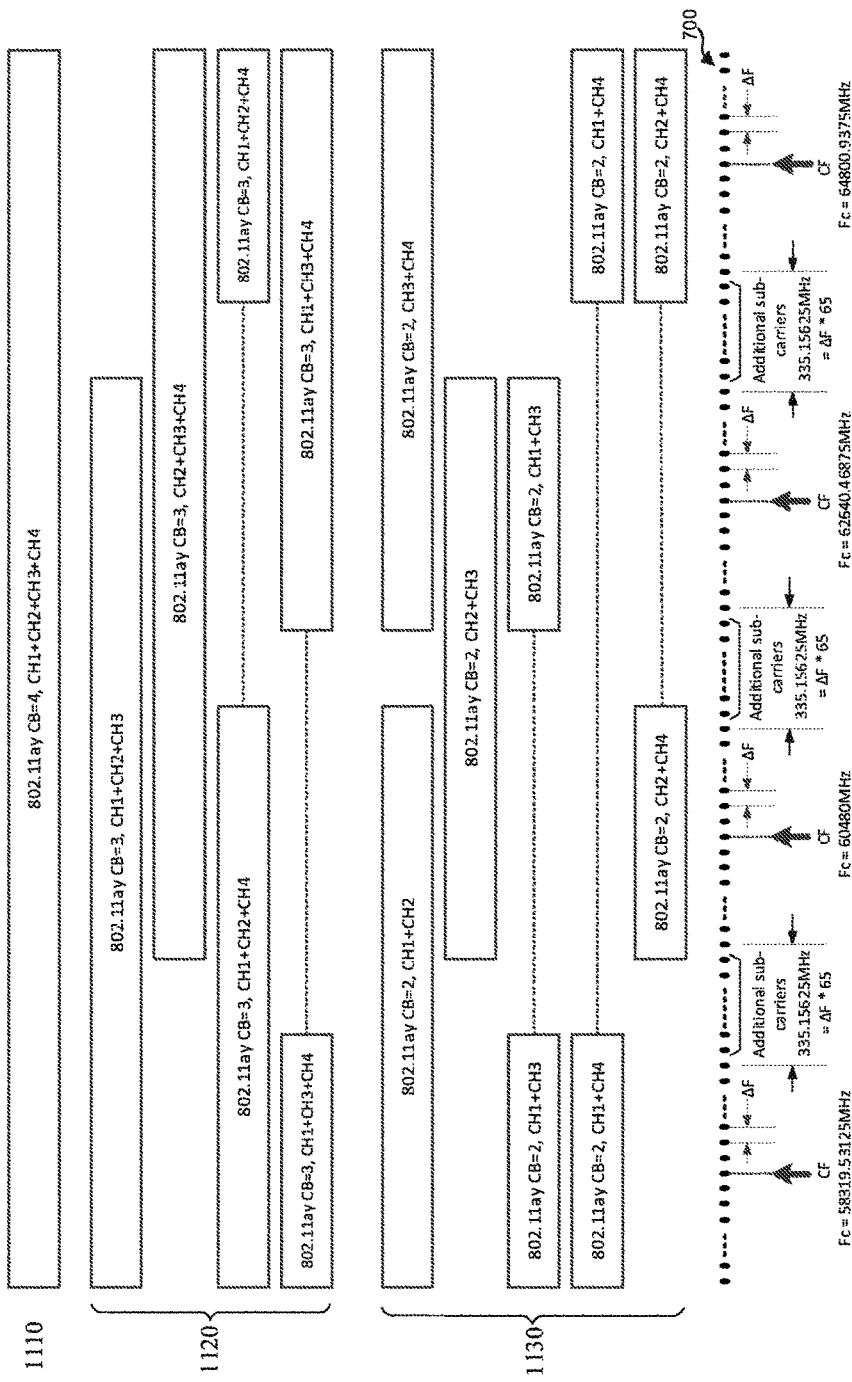
FIG. 11 illustrates various channel bonding (CB) options in accordance with certain aspects of the present disclosure.

FIG. 11 shows an example of different channel bonding (CB) options, in which each row corresponds to a different CB option. For example, the top row 1110 shows an example where all four channels are bonded. The center rows 1120 show examples where three channels are bonded, and the bottom rows 1130 show examples where two channel are bonded. As shown in FIG. 11, when two or more contiguous channels are used, it is possible (and recommended) to use also the gaps for OFDM sub-carriers (in the suggested case 64 sub-carriers are added per gap). The numbering of the sub-carriers in CB modes can be similar to the existing numbering scheme (0 is the center per CB option) or global (one indexing for all channel regardless of CF or CB). This has no impact on the re-channelization.

FIG. 11 also shows the redefined channel center frequencies and sub-carrier frequencies according to the example discussed above. In this example, the redefined channel center frequencies and sub-carrier frequencies may be used for any of the CB options. For instance, for the CB option in which channels CH1, CH2 and CH3 are bonded (CB=3, CH1+CH2+CH3), the redefined sub-carrier frequencies for channels CH1, CH2 and CH3 may be used as well as the additional sub-carrier frequencies in the gap between CH1 and CH2 and the gap between CH2 and CH3. In this example, the sub-carrier frequencies for CH2 are the same as the legacy sub-carrier frequencies for CH2 by design (although this need not be the case). In another example, for the CB option in which channels CH3 and CH4 are bonded (CB=2, CH3+CH4), the redefined sub-carrier frequencies for channels CH3 and CH4 may be used as well as the additional sub-carrier frequencies in the gap between CH3 and CH4.

It is to be appreciated that the present disclosure is not limited to the examples discussed above. Although the frequency grid 700 is aligned with the legacy center frequency for channel CH2 in FIG. 11 for simplicity, it is to be appreciated that the present disclosure is not limited to this example. For instance, the frequency grid 700 may be aligned with the legacy center frequency of any one of the other channels (i.e., CH1, CH3 or CH4). In another example, the frequency grid 700 may not be aligned with the legacy center frequency of any of the channels. In any case, the sub-carriers of each channel and the additional subcarriers in the gaps may be aligned with respective frequency positions of the frequency grid, in which the frequency positions of the grid are evenly spaced (e.g., by a sub-carrier spacing).

Figure 12:
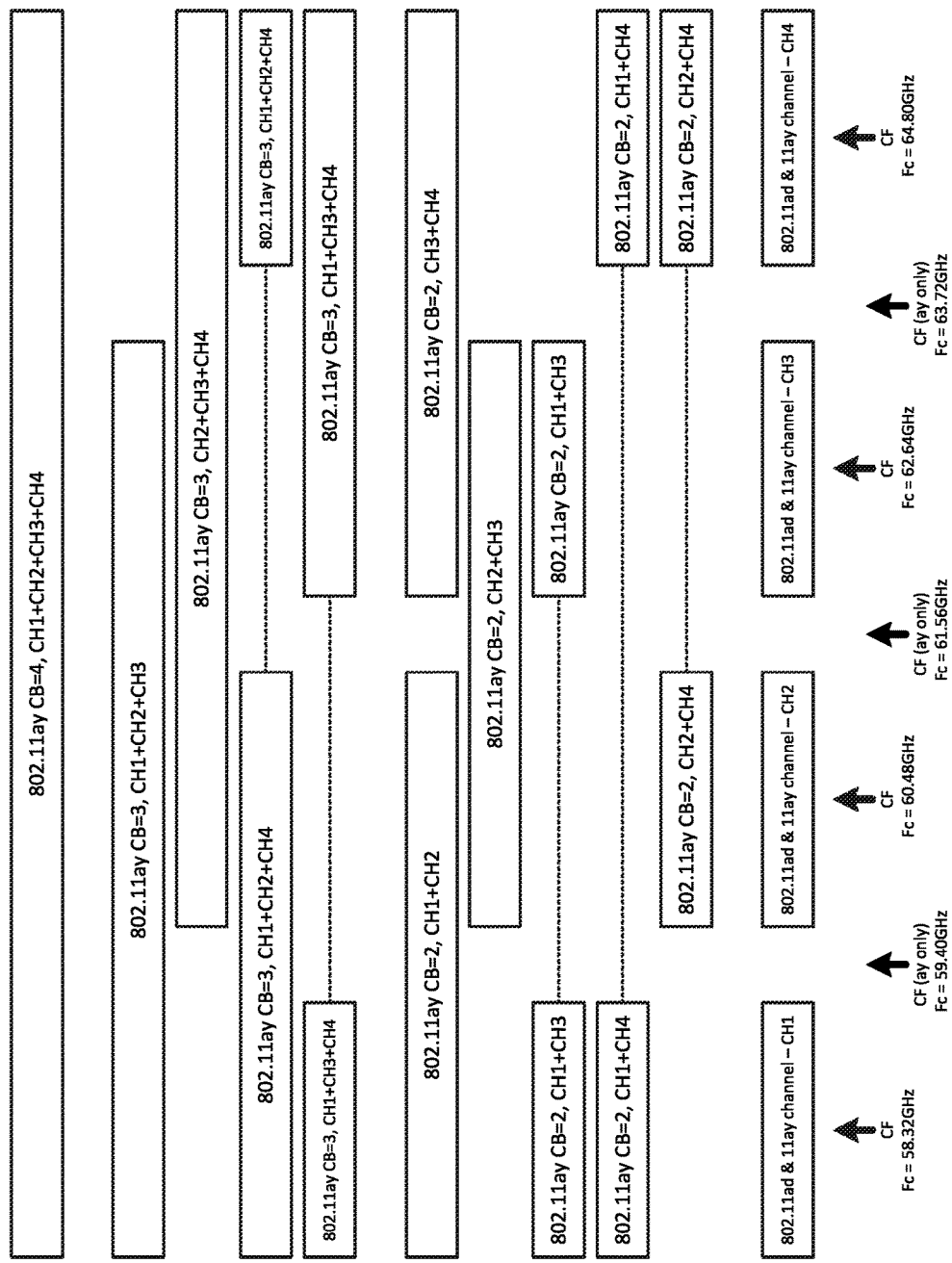
FIG. 12 illustrates the various channel bonding (CB) options, and center frequencies for the CB options in accordance with certain aspects of the present disclosure.

FIG. 12 shows the different channel bonding (CB) options and exemplary center frequencies for the different CB options, as discussed further below. For two channel bonding, the center frequencies may be: 59399.765625 MHz (CH1+CH2), 61560.234375 MHz (CH2+CH3), and 63720.703125 MHz (CH3+CH4). For three channel bonding, the center frequencies may be: 60480 MHz (CH1+

CH2+CH3) and 62640.46875 MHz (CH2+CH3+CH4). For four channel bonding, the center frequency may be 61560.234375 MHz.

As shown in FIG. 12, some of the center frequencies discussed above correspond to channel center frequencies in 802.11ad. Center frequencies that are only used in 802.11ay in the examples discussed above are indicated as "ay only" in FIG. 12. For the case where only one channel is used (e.g., frame 300 in FIG. 3A), the legacy center frequency for the channel may be used, as shown in FIG. 12.

It is to be appreciated that the present disclosure is not limited to the example in which the same frequency grid is used for all CB options. For example, different frequency grids may be used depending on a selected CB option. For example, each of the CB options shown in the example in FIG. 12 may use a frequency grid that is aligned with the respective center frequency (i.e., a frequency position of the grid is aligned with the respective center frequency). The frequency positions of each grid may be evenly spaced (e.g., by a sub-carrier spacing). In one example, the receiver may know in advance which CB option is being used, and therefore which grid to use (e.g., to receive the 802.11ay portion of a frame). For instance, the transmitter may transmit an indicator to the receiver indicating which CB option is being used (e.g., prior to transmission of the 802.11ay portion). The indicator may be transmitted before the frame and/or included in a header in the EDMG of the frame.

As discussed above, the legacy channel center frequencies may be used to transmit or receive a first portion of the frame (which may include L-STF, L-CEF, L-Header and EDMG Header) on one or more of the channels. The transmitter or receiver may then perform a frequency shift according to its center frequency to transmit or receive a second portion of the 802.11ay frame using the redefined channel center frequencies and sub-carrier frequencies. The second portion of the frame may include the 802.11ay EDMG Data Payload (which may also be referred to as NG60 payload). The second portion may also include the EDMG STF and EDMG CEF.

The frequency may be changed before the 802.11ay portion of a frame (e.g., after the EDMG Header and attached data). The change should be synchronized with the start of STF, or CEF or Payload GI (guard interval) of the 802.11ay portion (whichever is first). Examples of frames comprising STF and CEF in the 802.11ay portion can be found, for example, in U.S. Provisional Application No. 62/147,479, filed on Apr. 29, 2015, titled "Frame Format for OFDM, SC WB, Aggregated SC, and Corresponding MIMO signals," the entire specification of which is incorporated herein by reference.

The transmitter should include a frequency rotator (if it is not already included) for the shift (change). The range for the shift may be −/+sub-carrier spacing divided by two (e.g., −2.578125 MHz . . . +2.578125 MHz) or smaller. The frequency shift may be synchronized as stated above.

The receiver may be tuned to one of the four channels or in the middle of two adjacent channels (as presented above), and can receive the legacy portion (e.g., L-STF, L-CEF and L-Header) and EDMG Header. During the L-STF, the receiver may lock the frequency correction. Just before the 802.11ay portion, the receiver should update the frequency rotator frequency offset to compensate for the OFDM shift. The receiver should compensate the frequency shift of the CEF (if L-CEF is used) relative to the OFDM center bin. This operation is easy since the CEF is performed by Golay correlator that estimates the channel (CE) in time domain.

Before the CE is converted to frequency domain, the CE can be shifted by a phasor that rotates at the frequency to be shifted. If CE is performed on 802.11ay CEF then there is no need for compensation since CEF will be transmitted according to the shifted frequency.

Figure 13:
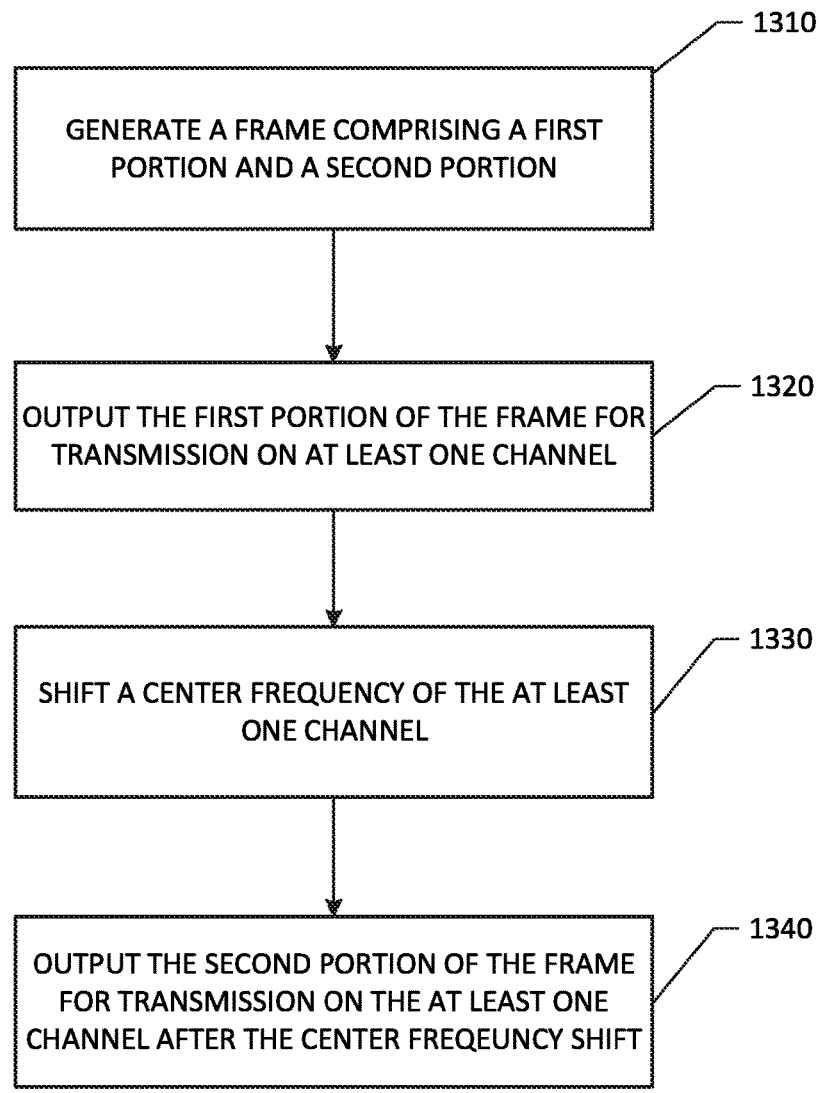
FIG. 13 is a flowchart of a method for wireless communication in accordance with certain aspects of the present disclosure.

FIG. 13 is a flowchart illustrating a method 1300 for wireless communication according to aspects of the present disclosure. The method 1300 may be performed by a transmitter in a wireless node.

In step 1310, a frame is generated comprising a first portion and a second portion. For example, the frame may be generated by the frame builder 222 or 226 of a wireless node (e.g., access point 210 or access terminal 220). In one example, the frame may be an 802.11ay frame. In this example, the first portion may comprise an L-STF, L-CEF, L-Header and EDMG Header, and the second portion may comprise a payload (e.g., EDMG Data Payload). The second portion may also include an EDMG STF and an EDMG CEF.

In step 1320, the first portion of the frame is output for transmission on the at least one channel For example, the first portion (e.g., 802.11ad portion) may be output for transmission on the at least one channel using the legacy channel center frequency discussed above.

In step 1330, a center frequency of the at least one channel is shifted. For example, the center frequency may be shifted from a legacy channel center frequency (e.g., shown in FIG. 6) to a redefined channel center frequency (e.g., shown in FIG. 7).

In step 1340, the second portion of the frame is output for transmission on the at least one channel after the center frequency shift. For example, the second portion (e.g., 802.11ay portion) may be output for transmission on the at least one channel using the redefined channel center frequency discussed above.

Figure 14:
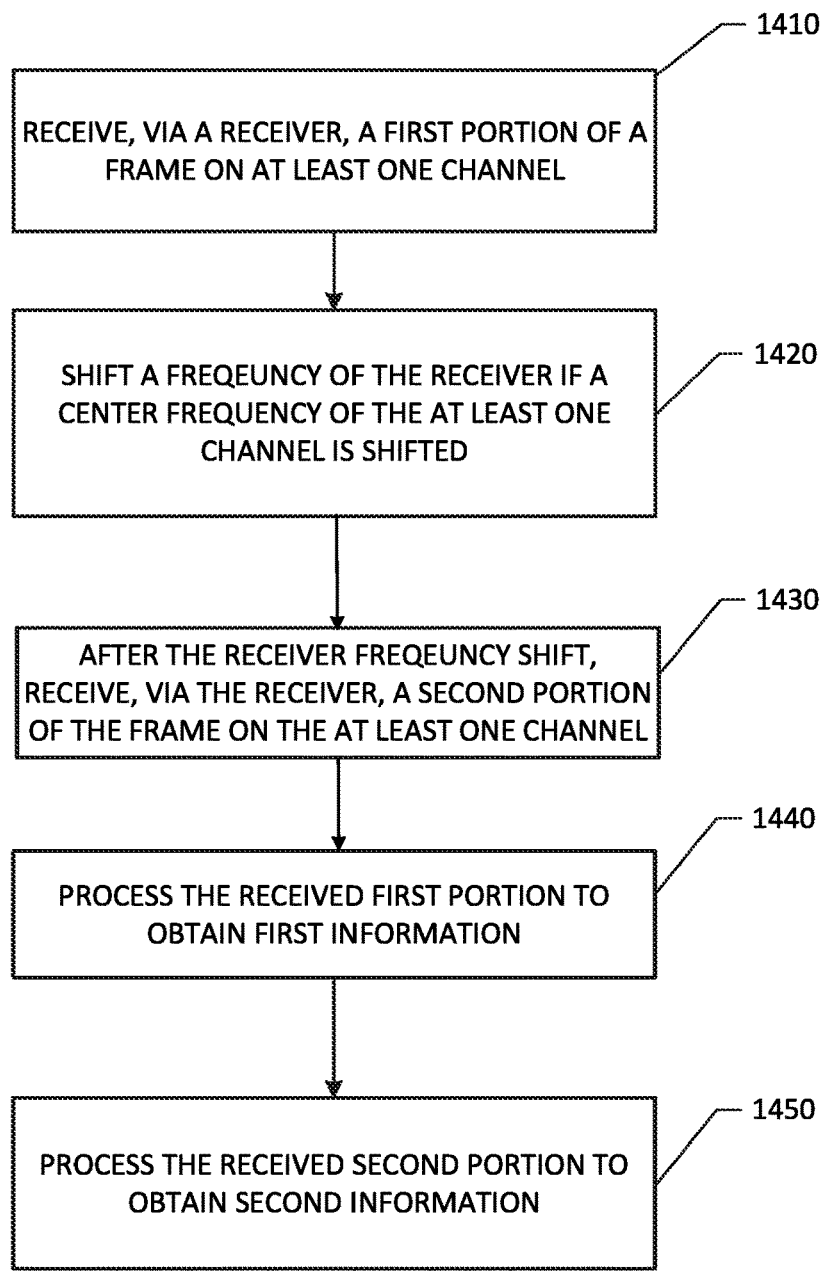
FIG. 14 is a flowchart of a method for wireless communication in accordance with certain aspects of the present disclosure.

FIG. 14 is a flowchart illustrating a method 1400 for wireless communication according to aspects of the present disclosure. The method 1400 may be performed by a receiver in a wireless node.

In step 1410, a first portion of a frame is received, via a receiver, on at least one channel. For example, the frame may be an 802.11ay frame, and the first portion may comprise an L-STF, L-CEF, L-Header and EDMG Header.

In step 1420, a frequency of the receiver is shifted if a shift in a center frequency of the at least one channel is shifted. For example, the frequency of the receiver may be shifted using a rotation unit in a receive path of the receiver used for frequency correction, as discussed above. The shift in the center frequency of the at least one channel be may be a shift from a legacy channel center frequency (e.g., shown in FIG. 6) to a redefined channel center frequency (e.g., shown in FIG. 7).

In step 1430, after the receiver frequency shift, a second portion of the frame is received, via the receiver on the at least one channel In step 1440, the received first portion is processed to obtain first information. For example, the first information may comprise frame timing information (e.g., using L-STF in the first portion), a channel estimation (e.g., using L-CEF in the first portion), header information (e.g., using L-Header in the first portion), etc.

In step 1450, the received second portion is processed to obtain second information. The second information may comprise data (e.g., EDMG Payload).

Figure 15:
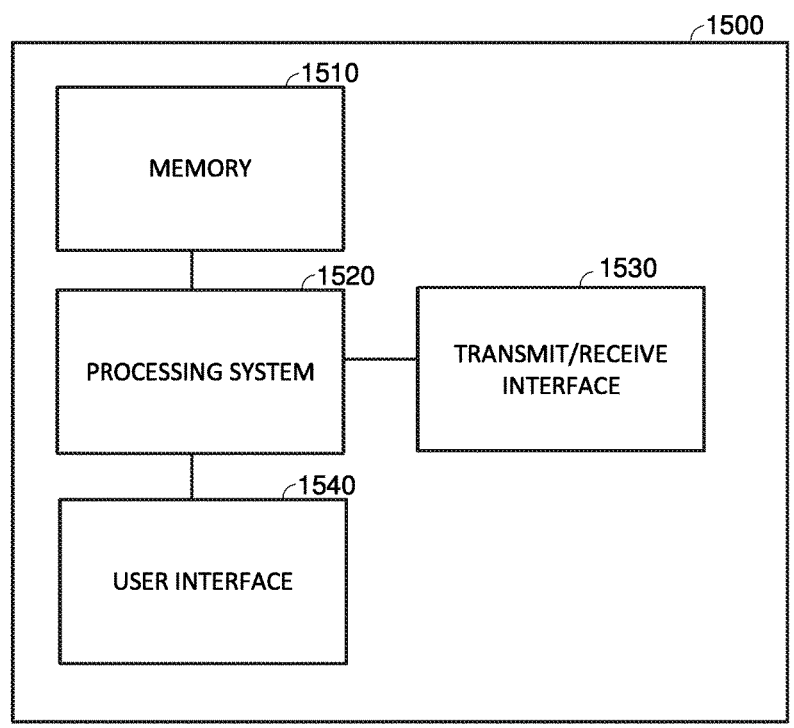
FIG. 15 illustrates an exemplary device in accordance with certain aspects of the present disclosure.

FIG. 15 illustrates an example device 1500 according to certain aspects of the present disclosure. The device 1500 may be configured to operate in a wireless node (e.g., access point 210 or access terminal 220) and to perform one or more of the operations described herein. The device 1500 includes a processing system 1520, and a memory 1510 coupled to the processor system 1520. The memory 1510 may store instructions that, when executed by the processing system 1520, cause the processing system 1520 to perform one or more of the operations described herein. Exemplary implementations of the processing system 1520 are provided below. The device 1500 also comprises a transmit/receiver interface 1530 coupled to the processing system 1520. The interface 1530 (e.g., interface bus) may be configured to interface the processing system 1520 to a radio frequency (RF) front end (e.g., transceivers 226-1 to 226-N or 226-1 to 266-N).

In certain aspects, the processing system 1520 may include one or more of the following: a transmit data processor (e.g., transmit data processor 218 or 260), a frame builder (e.g., frame builder 222 or 262), a transmit processor (e.g., transmit processor 224 or 264) and/or a controller (e.g., controller 234 or 274) for performing one or more of the operations described herein.

In the case of an access terminal 220, the device 1500 may include a user interface 1540 coupled to the processing system 1520. The user interface 1540 may be configured to receive data from a user (e.g., via keypad, mouse, joystick, etc.) and provide the data to the processing system 1520. The user interface 1540 may also be configured to output data from the processing system 1520 to the user (e.g., via a display, speaker, etc.). In this case, the data may undergo additional processing before being output to the user. In the case of an access point 210, the user interface 1540 may be omitted.

Examples of means for generating a frame comprising a first portion and a second portion include the frame builder 222 or 262, the transmit data processor 218 or 260, the controller 234 or 274, and the processing system 1520. Examples of means for outputting the first portion of the frame for transmission on at least one channel include the transmit processor 224 or 264, the transceivers 226-1 to 226-N or 266-1 to 266-N, and the transmit/receive interface 1530. Examples of means for shifting a center frequency of the at least one channel include the transmit processor 224 or 264, the transceivers 226-1 to 226-N or 266-1 to 266-N, the controller 234 or 274, the processing system 1520, and the transmit/receive interface 1530. Examples of means for outputting the second portion of the frame for transmission on the at least one channel after the center frequency shift include the transmit processor 224 or 264, the transceivers 226-1 to 226-N or 266-1 to 266-N, and the transmit/receive interface 1530.

Examples of means for receiving a first portion of a frame on at least one channel include the transceivers 226-1 to 226-N or 266-1 to 266-N, the receive processor 242 or 282, and the transmit/receive interface 1530. Examples of means for shifting a receiver frequency of the apparatus if a center frequency of the at least one channel is shifted include the transceivers 226-1 to 226-N or 266-1 to 266-N, the receive processor 242 or 282, the controller 234 or 274, the processing system 1520, and the transmit/receive interface 1530. Examples of means for receiving, after the receiver frequency shift, a second portion of the frame on the at least one channel include the transceivers 226-1 to 226-N or 266-1 to 266-N, the receive processor 242 or 282, and the transmit/receive interface 1530. Examples of means for processing the received first portion of the frame to obtain first information include the receive processor 242 or 282, the receive data processor 244 or 284, the controller 234 or 274, and the processing system 1520. Examples of means for processing the received second portion of the frame to obtain second information include the receive processor 242 or 282, the receive data processor 244 or 284, the controller 234 or 274, and the processing system 1520.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of an access terminal (e.g., access terminal 220), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal (e.g., access terminal 220), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by an access terminal (e.g., access terminal 220) and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that an access terminal (e.g., access terminal 220) and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
generating a frame comprising a first portion and a second portion, wherein the first portion of the frame comprises at least one of a short training field (STF), a channel estimation sequence (CES) or a header, and the second portion of the frame comprises a data payload;
outputting the first portion of the frame for transmission on a plurality of channels, each of the plurality of channels having a respective center frequency;
bonding at least two channels of the plurality of channels to form a bonded channel;
shifting the center frequency of each of one or more of the plurality of channels, wherein a spacing between edge sub-carriers of two adjacent channels of the plurality of channels is an integer multiple of a spacing between sub-carriers after the center frequency shift; and
outputting the second portion of the frame for transmission on the plurality of channels after the center frequency shift, said plurality of channels including the bonded channel.

2. The method of claim 1, wherein the first portion of the frame is output for transmission using a single-carrier (SC) mode of transmission, and the second portion of the frame is output for transmission using an orthogonal frequency division multiplexing (OFDM) mode of transmission.

3. The method of claim 1, wherein the center frequency shift is between minus 2.58 MHz and plus 2.58 MHz.

4. The method of claim 1, wherein, after the center frequency shift, the center frequency of each of the plurality of channels is aligned with a respective one of a plurality of frequency positions of a frequency grid, wherein the plurality of frequency positions of the frequency grid are approximately evenly spaced.

5. The method of claim 4, wherein the second portion of the frame is output for transmission on the plurality of channels via a plurality of carriers, each of the plurality of carriers being aligned with a respective one of the plurality of frequency positions of the frequency grid.

6. The method of claim 5, wherein the plurality of carriers comprises a plurality of orthogonal frequency division multiplexing (OFDM) sub-carriers.

7. The method of claim 1, wherein:
the second portion of the frame is output for transmission on the channels via a plurality of carriers; and
after the center frequency shift, a spacing between the center frequencies of the channels is equal to one of 418 times a carrier spacing, 419 times a carrier spacing, or 420 times a carrier spacing.

8. The method of claim 1, wherein the spacing between the edge sub-carriers of the two adjacent channels is not an integer multiple of the spacing between the sub-carriers before the center frequency shift.

9. The method of claim 1, wherein the center frequency of one of the plurality of channels is not shifted.

10. The method of claim 4, wherein the center frequency of one of the plurality of channels is already aligned with one of the frequency positions of the frequency grid before the frequency shift.

11. The method of claim 7, wherein the carrier spacing is approximately equal to 5.15625 MHz.

12. An apparatus for wireless communications, comprising:
a processing system configured to:
generate a frame comprising a first portion and a second portion, wherein the first portion of the frame comprises at least one of a short training field (STF), a channel estimation sequence (CES) or a header, and the second portion of the frame comprises a data payload; and
an interface configured to:
output the first portion of the frame for transmission on a plurality of channels, each of the plurality of channels having a respective center frequency;
wherein the processing system is further configured to:
shift the center frequency of each of one or more of the plurality of channels, wherein a spacing between edge sub-carriers of two adjacent channels of the plurality of channels is an integer multiple of a spacing between sub-carriers after the center frequency shift; and
bond at least two of the plurality of channels to form a bonded channel; and
wherein the interface is further configured to:
output the second portion of the frame for transmission on the plurality of channels after the center frequency shift, wherein the plurality of channels comprise the bonded channel.

13. The apparatus of claim 12, wherein the first portion of the frame is output for transmission using a single-carrier (SC) mode of transmission, and the second portion of the frame is output for transmission using an orthogonal frequency division multiplexing (OFDM) mode of transmission.

14. The apparatus of claim 12, wherein the center frequency shift is between minus 2.58 MHz and plus 2.58 MHz.

15. The apparatus of claim 12, wherein, after the center frequency shift, the center frequency of each of the plurality of channels is aligned with a respective one of a plurality of frequency positions of a frequency grid, wherein the plurality of frequency positions of the frequency grid are approximately evenly spaced.

16. The apparatus of claim 15, wherein the second portion of the frame is output for transmission on the plurality of channels via a plurality of carriers, each of the plurality of carriers being aligned with a respective one of the plurality of frequency positions of the frequency grid.

17. The apparatus of claim 16, wherein the plurality of carriers comprises a plurality of orthogonal frequency division multiplexing (OFDM) sub-carriers.

18. The apparatus of claim 15, wherein the center frequency of one of the plurality of channels is already aligned with one of the frequency positions of the frequency grid before the center frequency shift.

19. The apparatus of claim 12, wherein:
the second portion of the frame is output for transmission on the channels via a plurality of carriers; and
after the center frequency shift, a spacing between the center frequencies of the channels is equal to one of 418 times a carrier spacing, 419 times a carrier spacing, or 420 times a carrier spacing.

20. The apparatus of claim 19, wherein the carrier spacing is approximately equal to 5.15625 MHz.

21. The apparatus of claim 12, further comprising a transmitter configured to transmit the first portion and the second portion of the frame, wherein the apparatus is configured as a wireless node.

22. A method for wireless communications, comprising:
receiving, via a receiver, a first portion of a frame on a plurality of channels, wherein the first portion of the frame comprises at least one of a short training field (STF), a channel estimation sequence (CES) or a header, and each of the plurality of channels has a respective center frequency;
shifting a frequency of the receiver if the center frequency of each of one or more of the plurality of channels is shifted, wherein a spacing between edge sub-carriers of two adjacent channels of the plurality of channels is an integer multiple of a spacing between sub-carriers if the center frequency of each of one or more of the plurality of channels is shifted;
after the receiver frequency shift, receiving, via the receiver, a second portion of the frame on the plurality of channels including a bonded channel, wherein the second portion of the frame comprises a data payload, and at least two channels of the plurality of channels are bonded to form the bonded channel;
processing the received first portion of the frame to obtain first information; and
processing the received second portion of the frame to obtain second information.

23. The method of claim 22, wherein the first information comprises at least one of a channel estimation, frame timing information or header information, and the second information comprises data in the data payload.

24. The method of claim 22, wherein the first portion of the frame is received using a single-carrier (SC) mode of transmission, and the second portion of the frame is received using an orthogonal frequency division multiplexing (OFDM) mode of transmission.

25. The method of claim 22, wherein shifting the frequency of the receiver comprises shifting the frequency of the receiver between minus 2.58 MHz and plus 2.58 MHz.

26. An apparatus for wireless communications, comprising:
an interface configured to receive, via a receiver, a first portion a frame on a plurality of channels, wherein:
the first portion of the frame comprises at least one of a short training field (STF), a channel estimation sequence (CES) or a header,
the interface is also configured to receive, via the receiver, a second portion of the frame on the plurality of channels comprising a bonded channel,
the second portion of the frame comprises a data payload, and
each of the plurality of channels has a respective center frequency; and; and
a processing system configured to:
shift a frequency of the receiver if the center frequency of each of one or more of the plurality of channels is shifted between reception of the first portion of the frame and reception of the second portion of the frame, wherein a spacing between edge sub-carriers of two adjacent channels of the plurality of channels is an integer multiple of a spacing between sub-carriers if the center frequency is shifted,
bond at least two channels of the plurality of channels to form the bonded channel,
process the received first portion of the frame to obtain first information, and
process the received second portion of the frame to obtain second information.

27. The apparatus of claim 26, wherein the first information comprises at least one of a channel estimation, frame timing information or header information, and the second information comprises data in the data payload.

28. The apparatus of claim 26, wherein the first portion of the frame is received using a single-carrier (SC) mode of transmission, and the second portion of the frame is received using an orthogonal frequency division multiplexing (OFDM) mode of transmission.

29. The apparatus of claim 26, wherein the frequency shift of the receiver is between minus 2.58 MHz and plus 2.58 MHz.

30. The apparatus of claim 26, further comprising the receiver configured to receive the first portion and the second portion of the frame, wherein the apparatus is configured as a wireless node.

* * * * *